United States Patent
Kondo

(10) Patent No.: US 8,077,567 B2
(45) Date of Patent: Dec. 13, 2011

(54) RECORDING AND REPRODUCING APPARATUS AND RECORDING AND REPRODUCING METHOD

(75) Inventor: Toshiharu Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 12/709,821

(22) Filed: Feb. 22, 2010

(65) Prior Publication Data

US 2010/0226223 A1 Sep. 9, 2010

(30) Foreign Application Priority Data

Mar. 9, 2009 (JP) ................................. 2009-055570

(51) Int. Cl.
*G11B 20/10* (2006.01)
(52) U.S. Cl. .................................. 369/47.15; 369/30.28
(58) Field of Classification Search ............... 369/30.18, 369/30.23, 30.28, 47.15
See application file for complete search history.

(56) References Cited

U.S. PATENT DOCUMENTS

| | | | |
|---|---|---|---|
| 7,158,456 B2 * | 1/2007 | Han et al. | ................... 369/47.15 |
| 7,310,699 B2 | 12/2007 | Sinclair | |
| 2001/0048642 A1 | 12/2001 | Berhan | |
| 2007/0064562 A1 * | 3/2007 | Han et al. | ................... 369/53.2 |
| 2007/0271312 A1 * | 11/2007 | Heller et al. | ................... 707/201 |

FOREIGN PATENT DOCUMENTS

| | | |
|---|---|---|
| EP | 0 957 486 A2 | 11/1999 |
| EP | 0 957 486 A3 | 11/1999 |
| JP | 3-130824 | 6/1991 |
| JP | 2000-172448 | 6/2000 |
| JP | 2007-522560 | 8/2007 |

* cited by examiner

*Primary Examiner* — Thang Tran
*Assistant Examiner* — Brenda Bernardi
(74) *Attorney, Agent, or Firm* — Oblon, Spivak, McClelland, Maier & Neustadt, L.L.P.

(57) ABSTRACT

A recording and reproducing apparatus includes a drive unit that reads data from a first medium and a drive unit control unit that controls the drive unit. The apparatus includes a second medium in which the same amount of data as the amount of data recorded in the first medium can be stored, and from or in which data is read or written at a speed higher than a speed at which data is read or written from or in the first medium. The apparatus further includes an input/output unit that inputs a reading request with which predetermined data is read from among data items stored in the first medium or second medium. The apparatus also includes an access control unit which controls the drive unit control unit or a second medium control unit.

10 Claims, 19 Drawing Sheets

EXAMPLE OF INTERNAL CONFIGURATION OF RECORDING AND REPRODUCING APPARATUS

EXAMPLE OF CASE WHERE SEEK ACTION IS PERFORMED

EXAMPLE OF CASE WHERE DISK READING IS CONTINUED

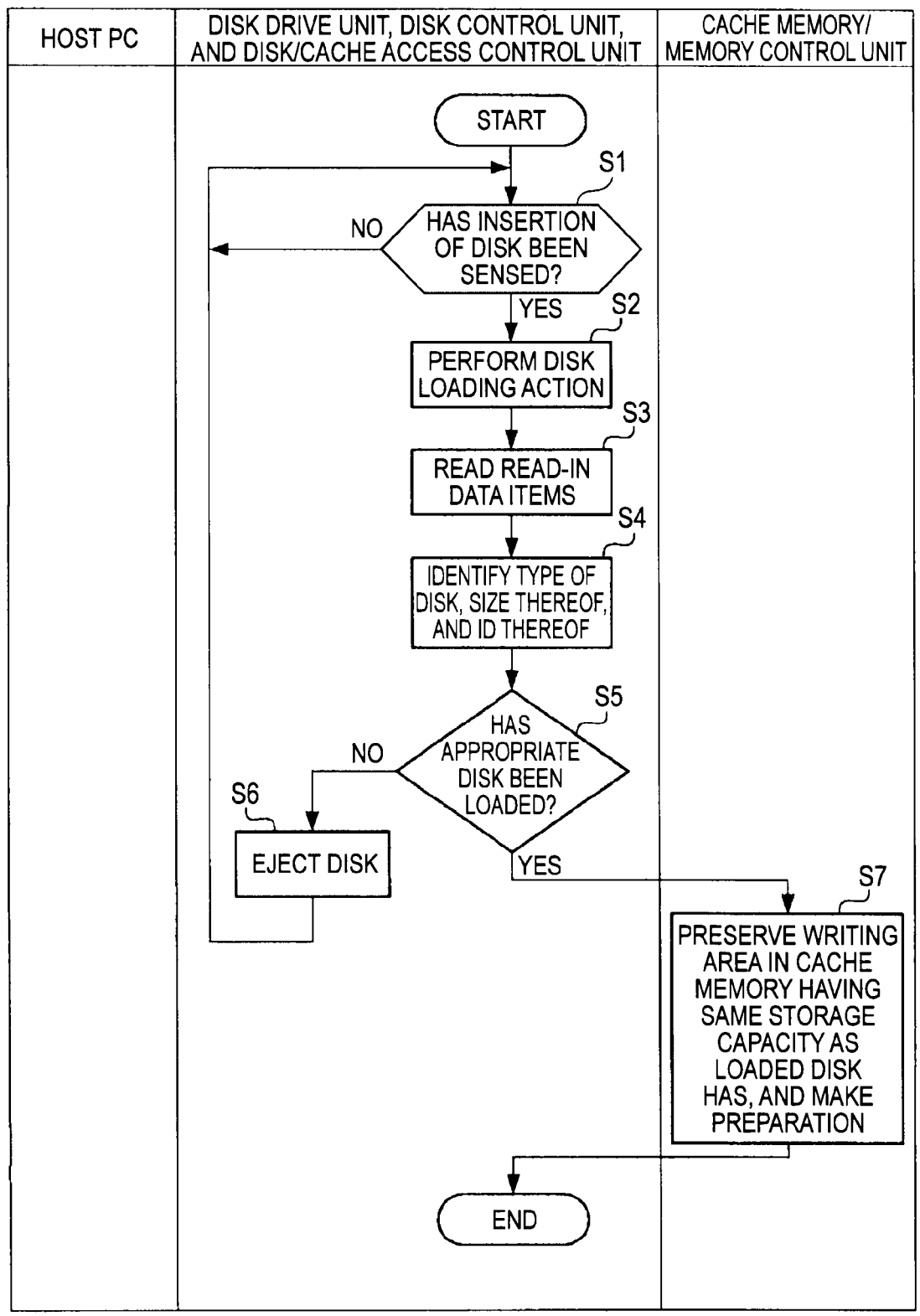

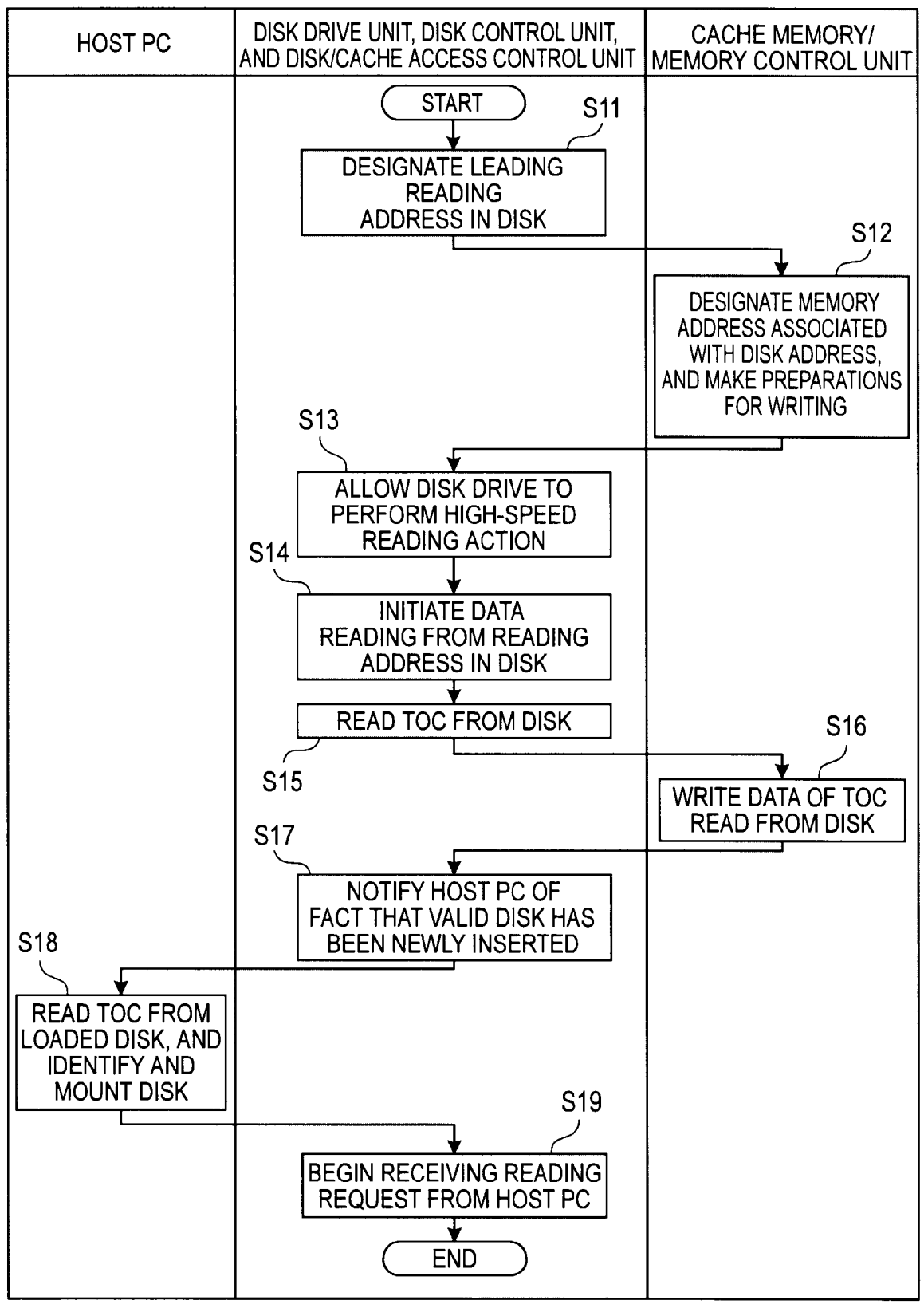

EXAMPLE OF PROCESSING TO BE PERFORMED
IN RESPONSE TO READING REQUEST ISSUED FROM HOST PC

EXAMPLE OF SEEK ACTION TO BE PERFORMED IN ORDER TO MOVE OPTICAL PICKUP TO DESIGNATED ADDRESS

FIG. 12 EXAMPLE OF CONFIGURATION OF DISK DRIVE DEVICE APPLIED TO CASE WHERE PLURAL DISKS ARE HANDLED

EXAMPLE OF DATA WRITING PROCESSING
ACCORDING TO DISK-DATA FIXED LENGTH STORAGE METHOD

EXAMPLE OF DATA WRITING PROCESSING ACCORDING
TO DISK-DATA VARIABLE LENGTH STORAGE METHOD

EXAMPLE OF DISK DATA READING PROCESSING APPLIED TO CASE WHERE WRITABLE DISK IS ADOPTED

EXAMPLE OF DISK EJECTING PROCESSING APPLIED TO CASE WHERE WRITABLE DISK IS ADOPTED

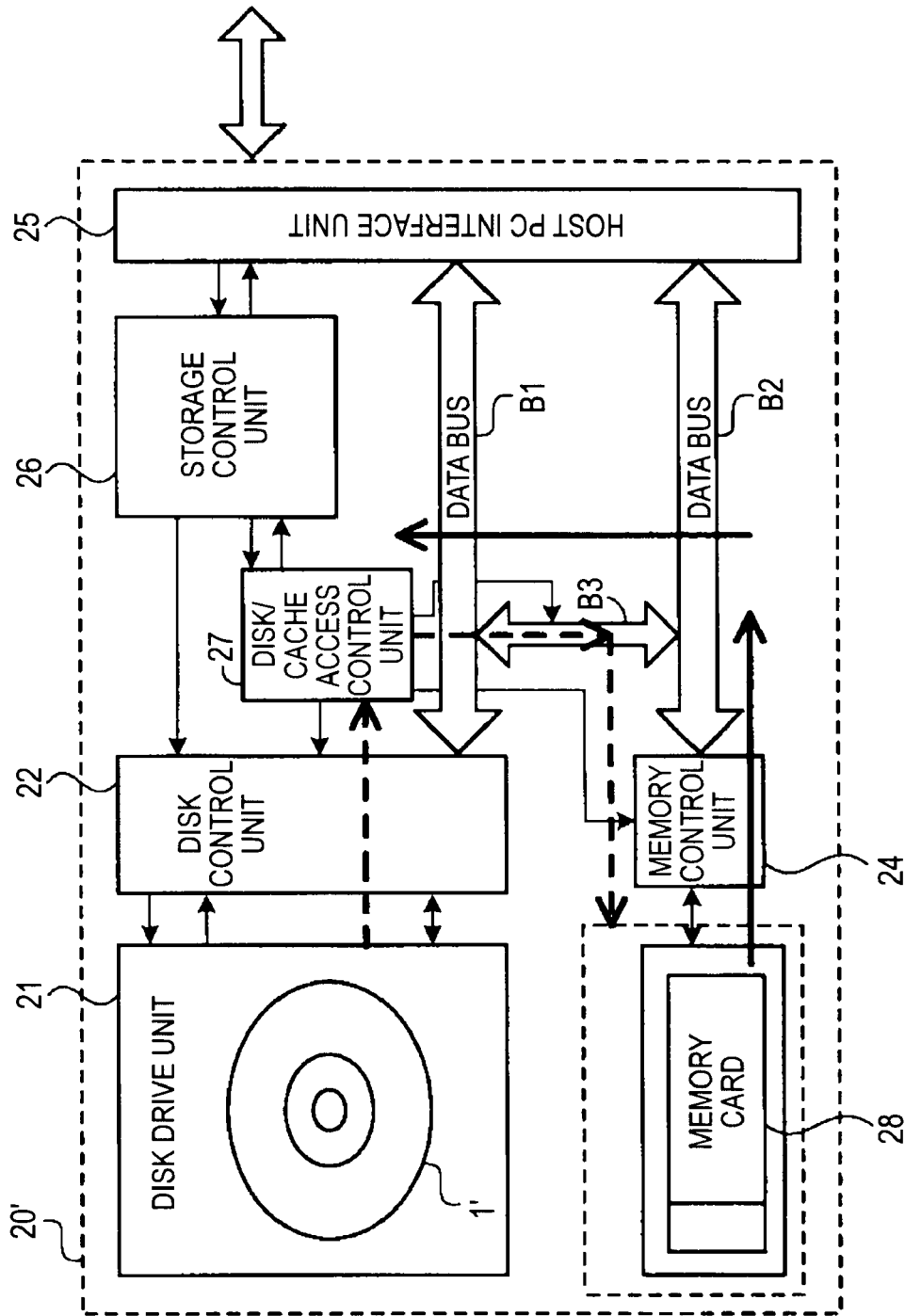

RECORDING AND REPRODUCING APPARATUS AND RECORDING AND REPRODUCING METHOD

BACKGROUND OF THE INVENTION

1. Field of the Invention

The present invention relates to a recording and reproducing apparatus and a recording and reproducing method. More particularly, the present invention is concerned with a technology for raising an accessing speed, at which data recorded in a disk is accessed, using a cache memory.

2. Description of the Related Art

In the past, a cache memory has been incorporated in a disk drive in efforts to speed up input/output (I/O) processing to be performed by the disk drive. The cache memory is used as a temporary preservation place for reading and writing. The cache memory having a small storage capacity of about several tens of megabytes or less is generally adopted. For reading or writing of data from or in a disk, if the data is not accessed in the cache memory (there is no hit), an access time gets longer due to addition of a seek time.

As a technique for raising a hit ratio of a cache memory, look-ahead caching is known. Look-ahead caching is such that when intended data is read from a disk, plural data items arrayed successively to the data are all read and stored in a cache memory. Namely, before a request for reading the succeeding array of data items is issued, the data items are read in advance from the disk and stored in the cache memory. Therefore, when the reading request is actually issued, the data items can be read quickly from the cache memory.

For reading successive data items from a disk, the technique has proved very useful because data items read beforehand and stored in the cache memory can be used to meet a reading request. However, the technique is not very useful in a case where data items are read randomly. In this case, the hit ratio of the cache memory is not high.

As a technique for solving the above problem, a technology in which when a specific sector in a floppy disk is accessed, the contents of an entire track including the specific sector are stored in a hard disk using the hard disk as a cache is described in, for example, JP-A-2000-172448 (Patent Document 1). Accordingly, a cache hit ratio to be attained when the specific sector whose contents are stored in the cache is accessed is raised.

SUMMARY OF THE INVENTION

According to the technology described in Patent Document 1, the contents of an entire track including a specific sector are stored in a disk. This poses a problem in that a cache hit ratio to be attained when a sector belonging to a track whose contents are not cached is accessed does not rise.

The present invention addresses the foregoing problem. It is desirable to make an accessing speed, at which a disk or any other medium is accessed, higher by reliably raising a hit ratio of a cache memory.

According to an embodiment of the present invention, there is provided a recording and reproducing apparatus including a drive unit that reads data from a first medium that is a medium in which data is recorded, and a drive unit control unit that controls the drive unit. In addition, the recording and reproducing apparatus includes a second medium in which the same amount of data as the amount of data recorded in the first medium can be stored, and from or in which data is read or written at a speed higher than a speed at which data is read or written from or in the first medium, and a second medium control unit that controls reading or writing of data from or in the second medium. Immediately after a loading action is performed on the first medium by the drive unit, reading all data items recorded in the first medium is initiated, and the data items read from the first medium are stored in the second medium. If a reading request is inputted during reading of data, the second medium and first medium are searched in that order in order to read data existent at a position designated with the reading request, and the read data is then outputted to an input/output unit. After outputting the data to the input/output unit is completed, reading data from the first medium is resumed from a position at which the outputting is completed.

Therefore, immediately after a loading action is performed on the first medium, all data items recorded in the first medium are read and stored in the second medium. When a data reading request is inputted, if data at a position designated with the reading request is found in the second medium, the data is read from the second medium that can be accessed at a higher speed.

While an action of reading data from the first medium and writing the data in the second medium is under way, if a reading request is received, and data at a position designated with the reading request is absent from the second medium, the action of reading data from the first medium and writing it in the second medium is suspended. The data present at the position, which is designated with the reading request, in the first medium is used to respond to the reading request. At the same time, writing data is resumed with the data existent at the position designated with the reading request.

Further, after responding to the reading request is completed, an action of reading data from the first medium and writing it in the second medium is resumed from a position in the first medium from which data is read last. Since the reading request is thus responded, positions in the first medium from which data is read and written in the second medium may become discontinuous. In this case, when reading data from positions in the first medium, which end with the final position, and writing it in the second medium is completed, a movement is made to the position of unread data in the first medium, and the data is read from the first medium and written in the second medium. Eventually, all the data items in the first medium are written in the second medium.

According to the present invention, all the data items recorded in the first medium are stored in the second medium. After storing the data items in the second medium is completed, if a data reading request is received, data is read from the second medium. Therefore, an accessing speed at which data is accessed rises.

Even during reading of data from the first medium, when a reading request is received, the reading request is responded to. Therefore, a response to the reading request may not be awaited until an action of reading data from the first medium and writing it in the second medium is completed.

Further, when a reading action is suspended, data at a position designated with a reading request is read from the first medium, and the reading request is responded to. At this time, an action of writing data in the second medium is performed. Even after responding to the reading request is completed, reading is resumed from a position from which data is read last. Therefore, reading data to be written in the second medium is efficiently achieved.

BRIEF DESCRIPTION OF THE DRAWINGS

FIG. 5A is concerned with a case where a seek action is performed, and FIG. 5B is concerned with a case where an action of reading data from a disk is continued;

FIG. 6A is concerned with a case where reading data from an area A and an area B in that order is achieved more quickly, and FIG. 6B is concerned with a case where reading data from the area B and area A in that order is achieved more quickly;

FIG. 7 is a flowchart showing an example of disk loading processing to be performed in the embodiment of the present invention;

FIG. 8 is a flowchart showing an example of TOC reading processing to be performed in the embodiment of the present invention;

FIG. 21 is a block diagram showing an example of the internal configuration of a recording and reproducing apparatus in accordance with another example (3) of the embodiment of the present invention.

DETAILED DESCRIPTION OF THE INVENTION

An embodiment of the present invention will be described below by orderly following subjects presented below.
1. Embodiment (example in which data is read from a read-only disk and stored in a cache memory)
2. Variant 1 of the embodiment (example in which data items in plural disks are read and stored in a cache memory)
3. Variant 2 of the embodiment (example in which reading and writing are performed on a writable disk)
4. Variant 3 of the embodiment (example in which a memory card is adopted as a cache memory)

1. Embodiment

Example of the Configuration of a Recording and Reproducing Apparatus

Figure 1:
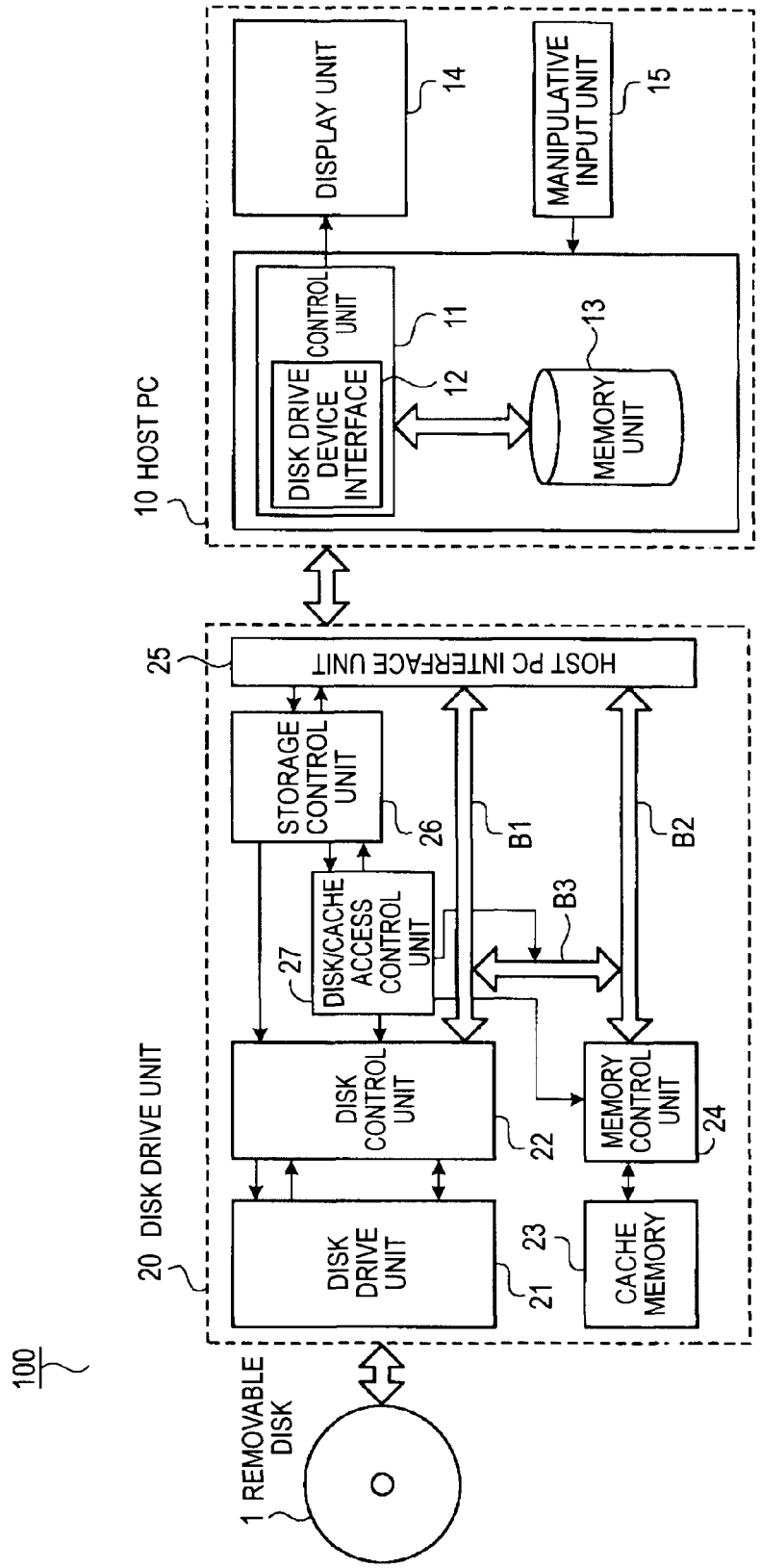
FIG. 1 is a block diagram showing an example of the internal configuration of a recording and reproducing apparatus in accordance with an embodiment of the present invention.

FIG. 1 is a block diagram showing an example of the configuration of a recording and reproducing apparatus 100 to which an example of the embodiment is adopted. The recording and reproducing apparatus 100 shown in FIG. 1 includes a host personal computer (PC) 10 and a disk drive device 20. The disk drive device 20 is a device that reads data recorded in a removable disk (first medium) 1. The reading is carried out in response to a data reading request issued from the host PC 10.

To begin with, the configuration of the host PC 10 will be described. The host PC 10 includes a control unit 11, a disk drive device interface 12, a memory unit 13, a display unit 14, and a manipulative input unit 15.

The control unit 11 is formed mainly with a central processing unit (CPU), and controls the components of the host PC 10. The control unit 11 produces a data reading request and feeds it to the disk drive device 20. The disk drive device interface 12 performs the processing of transmitting the reading request to the disk drive device 20 or receiving data sent from the disk drive device 20.

The memory unit 13 is formed with, for example, a hard disk drive (HDD) and others. Data and others read by the disk drive device 20 are stored in the memory unit 13. The display unit 14 is formed with, for example, a liquid crystal display (LCD) or an organic electroluminescent (EL) display. Data read from the disk 1 or data read from the memory unit 13 is displayed on the display unit. The manipulative input unit 15 is formed with, for example, a mouse and a keyboard (not shown), and accepts a manipulative input entered by a user. The manipulative input unit 15 then produces a manipulation signal representing the contents of the accepted manipulative input, and feeds it to the control unit 11.

Next, the configuration of the disk drive device 20 will be described. The disk drive device 20 includes a disk drive unit 21, a disk control unit 22, a cache memory 23 (second medium), a memory control unit 24, a host PC interface unit 25, a storage control unit 26, and a disk/cache access control unit 27.

The disk drive unit 21 includes an optical pickup and a servo circuit which are not shown, rotates the removable disk 1 inserted into a tray (not shown), and moves the optical pickup to a predetermined position so that data will be read or written from or in the removable disk 1.

What is referred to as the removable disk 1 is a medium realized with, for example, a compact disc (CD), a digital versatile disc (DVD), or a Blu-ray (registered trademark) disc (BD). Hereinafter, the removable disk 1 may be called simply the disk 1. In the present embodiment, a read-only disk is adopted as the removable disk 1. Audio data, video data, an application installer, game application software, a data source, and others shall be recorded in a data recording area in the removable disk 1.

When a reading request is outputted from the host PC 10, the disk control unit 22 implements control to move the head of the optical pickup of the disk drive unit 21 to an intended position over the disk 1 (seek). When the disk 1 is inserted into the disk drive device 20, the disk control unit 22 allows the disk drive unit 21 to perform a loading action. Even after read-in information is read from the disk 1 having been loaded, the disk control unit 22 in the present embodiment implements control so that all data items in the disk 1 will be continuously read. In this case, data reading is not performed in units of a file but performed in units of successive sectors orderly according to the sector addresses. The reading shall be performed at the highest driving speed.

The cache memory 23 is formed with a medium such as a static random access memory (SRAM) that offers a higher data reading/writing speed than the disk 1 does. The storage capacity of the cache memory is nearly equal to that of the disk 1. For preservation of data even after the power supply of the disk drive device 20 is turned off or the disk 1 is ejected, a flash memory may be adopted as the cache memory 23. The memory control unit 24 controls reading or writing of data from or in the cache memory 23.

The host PC interface unit 25 serving as an input/output unit transmits or receives data to or from the host PC 10, and is connected to the disk control unit 22 over a data bus B1, and connected to the memory control unit 24 over a data bus B2. The storage control unit 26 returns a response to the host PC 10.

The disk/cache access control unit 27 decides based on the contents of a reading request sent from the host PC 10 whichever of the disk control unit 22 and memory control unit 24 should be controlled to effect control. For example, if data whose reading is designated with the reading request is absent from the cache memory 23 (there is no hit), the disk/cache access control unit 27 controls the disk control unit 22 so that the data will be read from the disk 1.

In order to implement the foregoing control, the disk/cache access control unit 27 stores or manages pieces of information presented below.

Flag signifying a situation of reading data from the disk 1 (unread, reading-in-progress, or completed)

Effective data size for the disk 1 (leading address and ending address)

Address of each of areas in a data storage area from which data is read into the cache memory 23 (leading address and ending address)

Address from which data is currently being read (leading address, and reading-in-progress address)

The pieces of information are produced based on a table of contents (TOC) read from among read-in data items in the disk 1. Instead of managing pieces of information on areas in which data is written, pieces of information on areas from which data is not read (areas that have data writing skipped due to a reading request sent from the host PC 10) may be managed. Otherwise, pieces of information on a leading address of data and an ending address thereof may be managed, and addresses of the unread areas may be calculated.

[Outline of an Example of Actions to be Performed in the Recording and Reproducing Apparatus]

Figure 2:
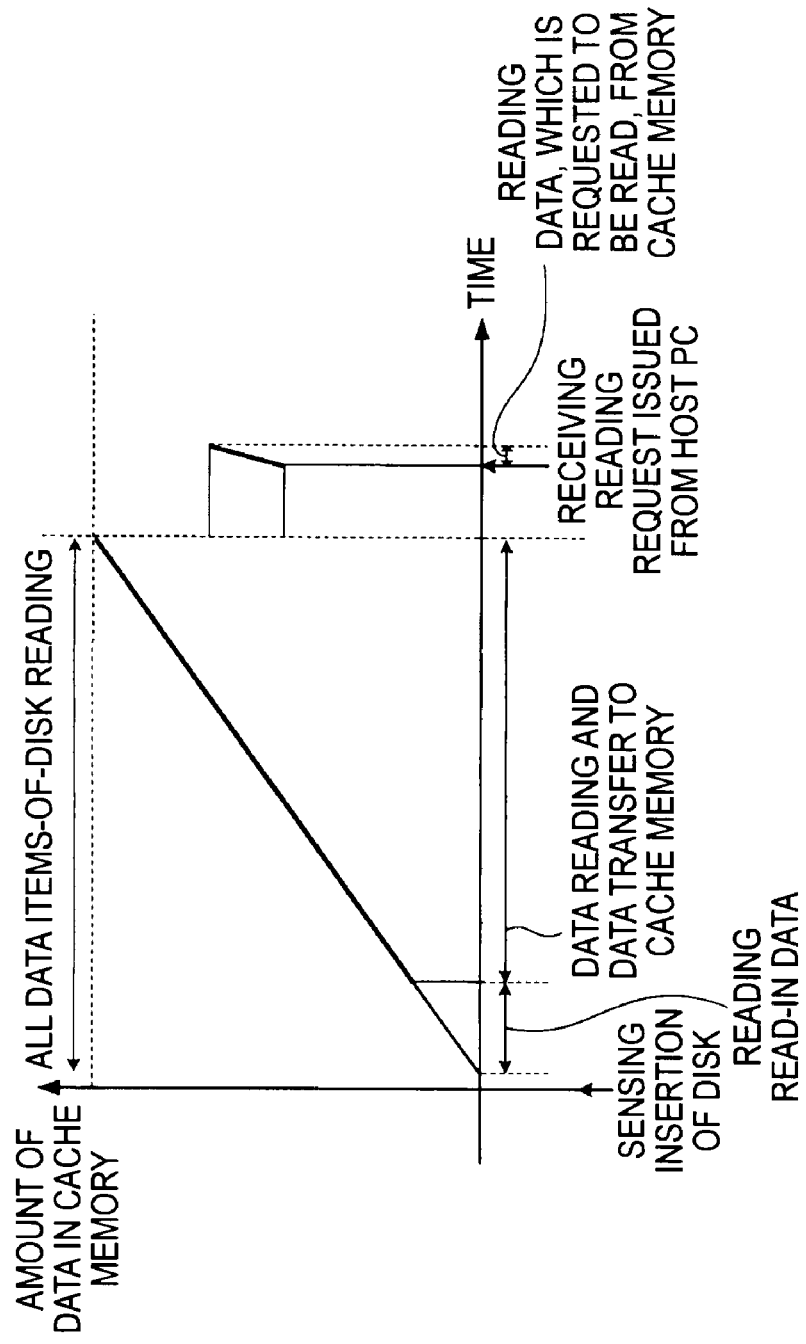
FIG. 2 is an explanatory diagram showing an example of actions to be performed in a disk drive device employed in the embodiment of the present invention.
Figure 3:
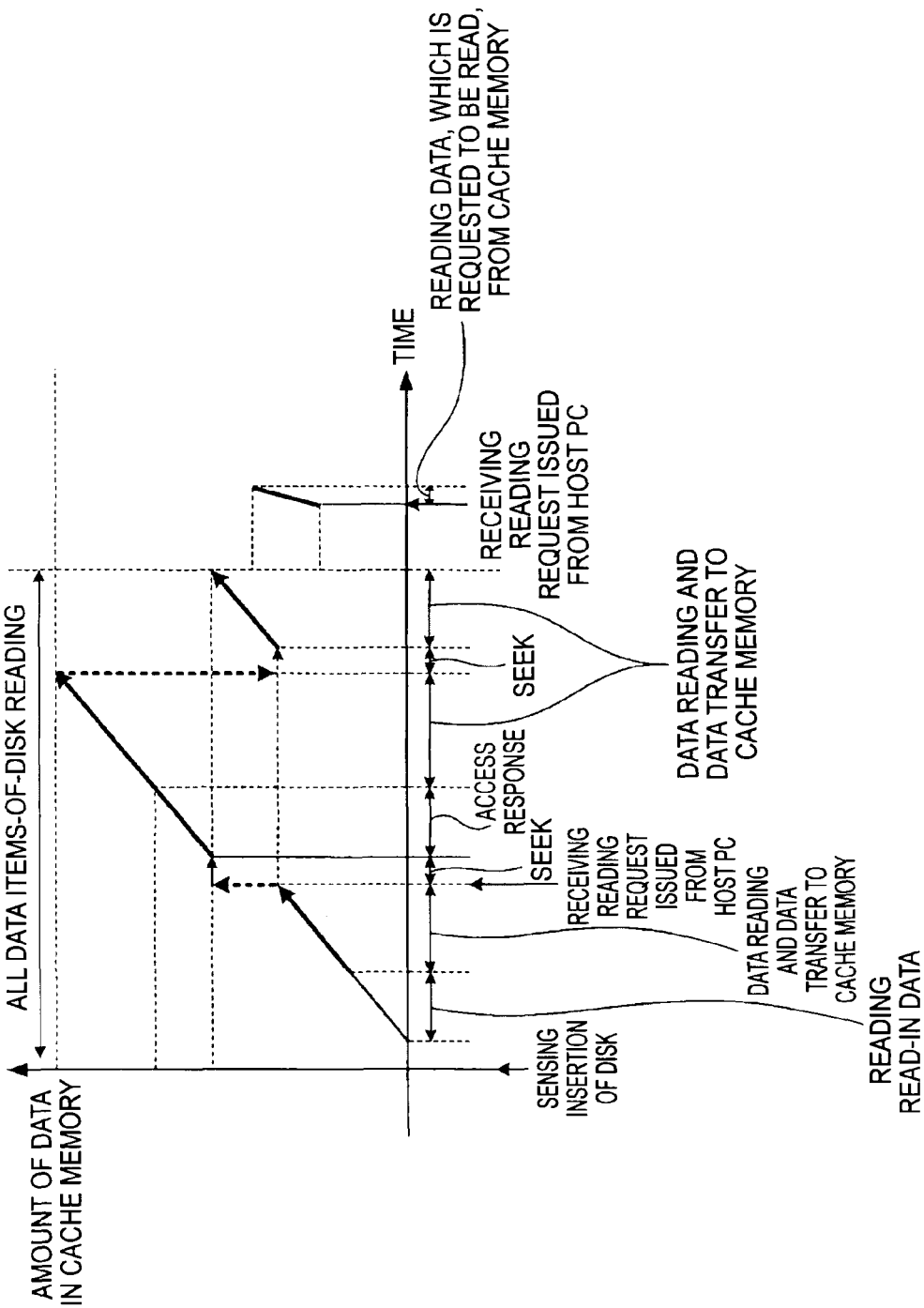
FIG. 3 is an explanatory diagram showing an example of actions to be performed in the disk drive device employed in the embodiment of the present invention.

Next, referring to FIG. 2 and FIG. 3, an example of actions to be performed in the recording and reproducing apparatus 100 of the present embodiment will be described below. In FIG. 2 and FIG. 3, the axis of abscissas indicates time, and the axis of ordinates indicates an amount of data in the cache memory 23 (positions in a memory space). The lower end point of the axis of ordinates indicates a leading address, and the upper end point thereof indicates an ending address.

FIG. 2 is concerned with a case where a reading request is not issued from the host PC 10 during a period from the initiation of all data items-of-disk 1 reading until the completion thereof. To begin with, when insertion of the disk 1 into the disk drive device 20 is sensed (the leftmost point on the axis of abscissas in the drawing), read-in data in the disk 1 is read under the control of the disk control unit 22 (see FIG. 1). Even after reading the read-in data is completed, reading is continued until all data items of the disk 1 are read. The thus read data items are all written in the cache memory 23 under the control of the memory control unit 24.

After writing data in the cache memory 23 is completed, if a reading request is received from the host PC 10, the memory control unit 24 is controlled by the disk/cache access control unit 27 (see FIG. 1). Data designated with the reading request is read from the cache memory 23.

FIG. 3 is concerned with a case where a reading request is issued from the host PC 10 during an all data items-of-disk 1 reading action. First, when insertion of the disk 1 into the disk drive device 20 is sensed (the leftmost point on the axis of abscissas), read-in data is read from the disk 1 under the control of the disk control unit 22. Even immediately after reading the read-in data is completed, reading data from the disk 1 and writing it in the cache memory 23 are continued.

When a reading request outputted from the host PC 10 is received, seek is performed in order to move the optical pickup to a position designated with the reading request. An upward arrow drawn with a dashed line indicates a difference between addresses between which the optical pickup is moved over the disk 1, and a rightward arrow indicates a seek time. After the optical pickup has reached an intended position through the seek, data items within a range designated with the reading request are read, and transferred to the host PC 10 via the host PC interface unit 25 (response to the reading request). Concurrently, the data items read from the disk 1 are written in the cache memory 23. Hereinafter, a response to a request issued from the host PC 10 shall be called an access response. For example, even when a writing request is transmitted from the host PC 10, the response shall be called the access response.

After the access response is made, reading data from the disk 1 is resumed from a point at which making the response is completed, and continued until data is read from an ending address. After the reading is continued until data is read from the ending address, seek is performed in order to move the optical pickup to a position at which the reading has been suspended due to the reading request. Reading data from the position at which the reading has not been performed, and writing the data in the cache memory 23 are carried out. Owing to this action, all data items in the disk 1 are written in the cache memory 23.

After writing data in the cache memory 23 is completed, if a reading request is received from the host PC 10, the memory control unit 24 is controlled by the disk/cache access control unit 27 (see FIG. 1). Data designated with the reading request is read from the cache memory 23.

Figure 4:
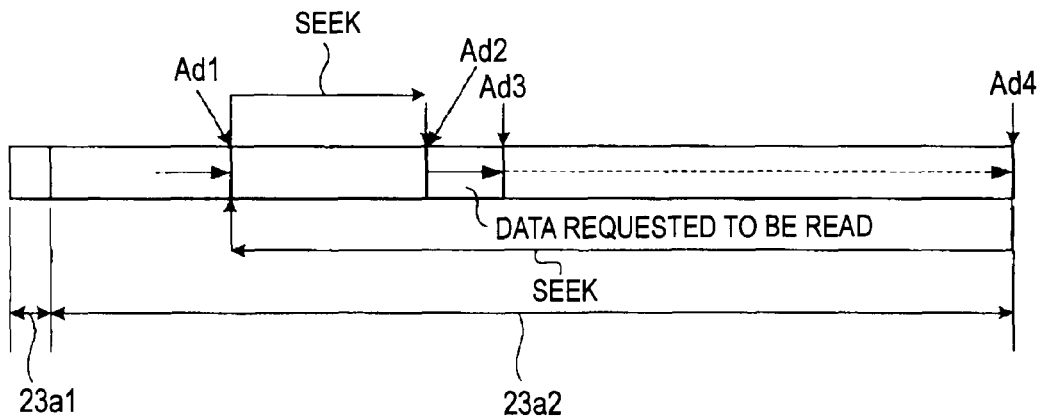
FIG. 4 is an explanatory diagram showing an example of actions to be performed in the disk drive device employed in the embodiment of the present invention.

FIG. 4 is a diagram for use in explaining the aforesaid all data items reading processing in terms of positions of addresses in a memory space in the cache memory 23. In FIG. 4, the axis of abscissas indicates the positions in the memory space of the cache memory 23. The leftmost point on the axis of abscissas indicates a leading address, and the rightmost point thereon indicates an ending address.

In the cache memory 23, a control data storage area 23a1 and a disk data writing area 23a2 are defined. In the disk data writing area 23a2, data items read from the disk 1 shall be stored in the same order as the order in which the data items are stored in the disk 1. Namely, the memory space in the cache memory 23 shall be associated with an address space in the disk 1.

In FIG. 4, at a time point when data items read from the disk 1 are written in a place ending with an address Ad1, if a reading request is received from the host PC 10, seek is performed in the disk drive device 20 in order to move the optical pickup to a point over the disk 1 designated with the reading request. In other words, no data is written in a place between the point of the address Ad1 at which the reading request is received and a point of an address Ad2 at which object data requested to be read begins.

When a reading request is received, a decision is made on whether seek is performed in order to move the optical pickup to a position designated with the reading request or reading data from the disk 1 is continued until the optical pickup reaches the position designated with the reading request (an access response is made later). Deciding whether a seek action is performed earlier will be detailed later with reference to FIG. 5A and FIG. 5B.

After seek is completed, data items within a range designated with the reading request are read from the disk 1, and written in a range from an address Ad2 to an address Ad3 in the cache memory 23. After the data items read in response to the reading request are written, reading data from the disk 1 is resumed from a position at which a response is made, and writing data in the cache memory 23 is also resumed from the position of the address Ad3. When reading data from the disk 1 proceeds to a reading border point in the disk 1 and read data items are written in a place ending with the point of the address Ad4 in the cache memory 23, the disk/cache access control unit 27 (see FIG. 1) performs sequence analysis.

What is referred to as sequence analysis is analysis of an area in the disk 1 from which data should be read next. In the example shown in FIG. 4, since an area from which data is not written into the cache memory 23 is only one area, the area is determined as an area, from which data is read next, through the sequence analysis. The sequence analysis will be described later with reference to FIG. 6A and FIG. 6B.

Data in an area determined to be read through sequence analysis is, in the example shown in FIG. 4, written in the range from the address Ad1 to the address Ad2 in the cache memory. Accordingly, all data items recorded in the data recording area in the disk 1 are written in the disk data writing area 23a2 in the cache memory 23.

Figure 5A:
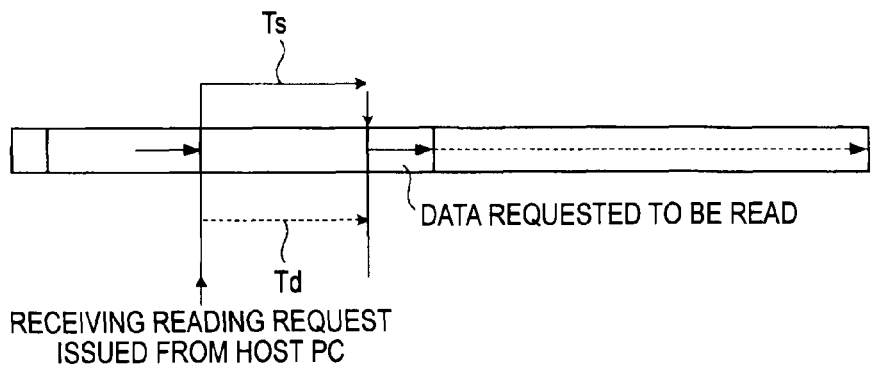
FIGS. 5A and 5B are explanatory diagrams showing examples in which performing a seek action is decided by the disk drive device employed in the embodiment of the present invention.
Figure 5B:
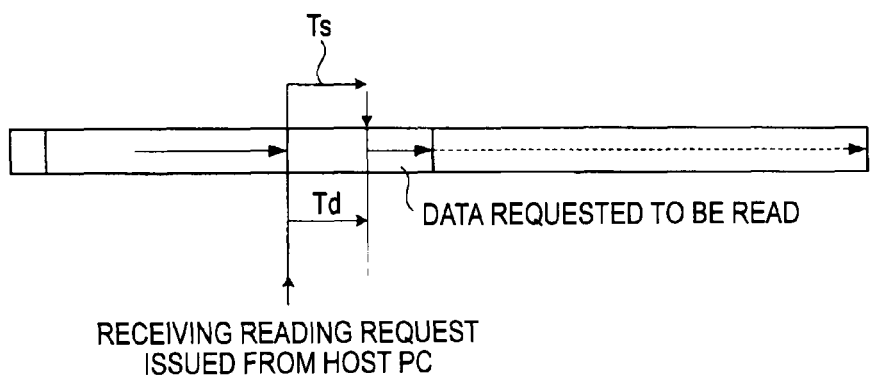

Referring to FIGS. 5A and 5B, deciding whether a seek action is performed or a reading action is continued, which is performed at the time of receiving a reading request from the host PC 10, will be described below. FIG. 5A is concerned with a case where a seek action is performed at the time of receiving the reading request from the host PC 10, and FIG. 5B is concerned with a case where a seek action is not performed at the time of receiving the reading request, but reading is continued. In FIGS. 5A and 5B, the axis of abscissas indicates positions in the memory space in the cache memory 23. The memory space shall be associated with the address space in the disk 1.

Whether a seek action is performed at the time of receiving a reading request is determined based on a time Ts it takes to perform the seek action, and a time Td it takes to continue reading data from the disk 1. Namely, seek or reading which takes a shorter time is adopted. The time Td and time Ts are calculated based on pieces of information presented below.

Information on a position at which reading is currently in progress (current address)

Information on an intended position designated with a reading request (destination address)

Seek time (difference between addresses)

Reading speed (difference between addresses)

In an example shown in FIG. 5A, a point at which reading is performed at the time of receiving the reading request and a point designated with the reading request are separated from each other in the address space in the disk 1. In this case, the time Td is longer than the time Ts. Therefore, a decision is made that it takes a shorter time to perform a seek action. The seek action is therefore performed earlier.

In an example shown in FIG. 5B, a point at which reading is performed at the time of receiving a reading request and a point designated with the reading request are relatively close to each other in the address space in the disk 1. In this case, the time Td is shorter than the time Ts. Therefore, a decision is made that it takes a shorter time to continue reading data from the disk 1. A reading action is therefore continued.

Figure 6A:
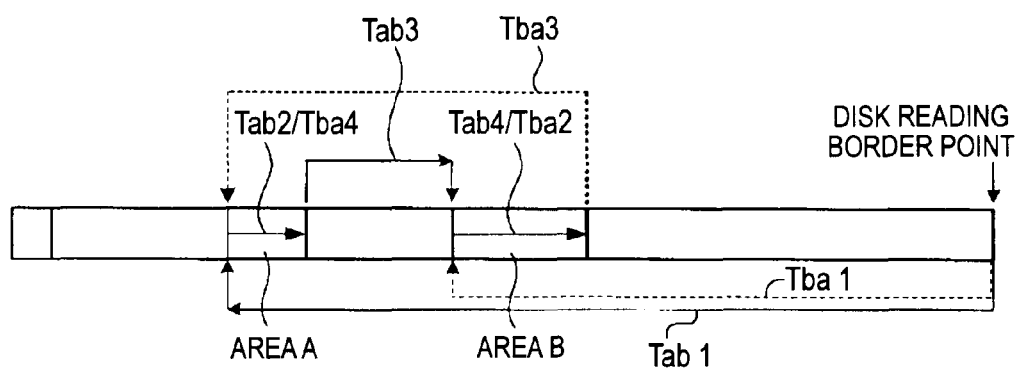
FIGS. 6A and 6B are explanatory diagrams showing example of sequence analysis to be performed in the embodiment of the present invention.
Figure 6B:
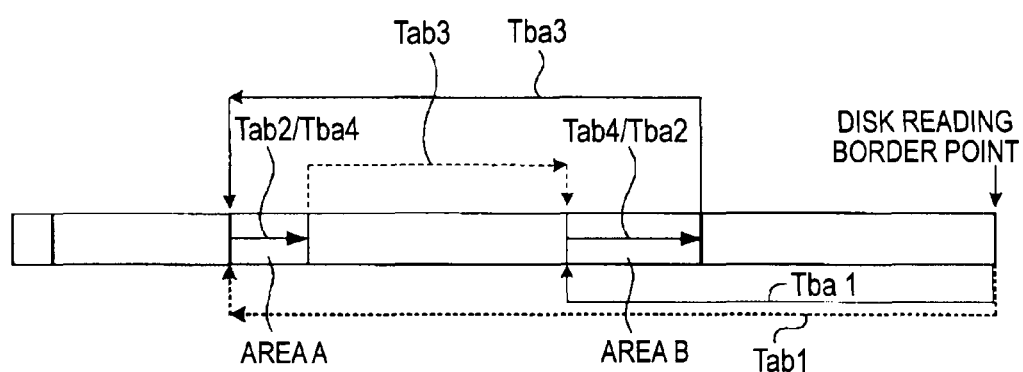

Next, referring to FIGS. 6A and 6B, sequence analysis will be detailed below. FIGS. 6A and 6B show situations in which when reading data from the disk 1 proceeds to a reading border point in the disk 1, from which of areas data should be read next is decided. Assume that a reading request has been issued twice from the host PC 10 in the past, and that data has not been read from two areas (areas A and B) (from each of which data has not been written in the cache memory 23) in the disk 1. Even in FIGS. 6A and 6B, the axis of abscissas indicates the memory space in the cache memory 23 that shall be associated with the address space in the disk 1.

In sequence analysis to be applied to the case shown in FIGS. 6A and 6B, a time Tab it takes to read data from the area A and area B in that order, and a time Tba it takes to read data from the area B and area A in that order are calculated. In either of FIGS. 6A and 6B, the time Tab is obtained as a seek time Tab1 necessary for the optical pickup to move from a border point to the area A+a reading time Tab2 necessary to read data from the area A+a seek time Tab3 necessary for the optical pickup to move to the area B+a reading time Tab4 necessary to read data from the area B.

The time Tba is obtained as a seek time Tba1 necessary for the optical pickup to move from a border point to the area B+a reading time Tba2 necessary to read data from the area B+a seek time Tba3 necessary for the optical pickup to move to the area A+a reading time Tba4 necessary to read data from the area A.

The above times are calculated based on pieces of information presented below.

Information on a position at which reading is currently in progress (current address)

Pieces of information on areas from which data should be read (leading and ending addresses of the first area, leading and ending addresses of the second area, etc., and leading and ending addresses of the n-th area)

Seek time (difference between addresses)

Reading speed (difference between addresses)

In an example shown in FIG. 6A, since the time Tab is shorter than the time Tba, a sequence of reading data from the area A and area B in that order is adopted. In an example shown in FIG. 6B, since the time Tab is longer than the time Tba, a sequence of reading data from the area B and area A in that order is adopted.

[Details of an Example of Actions to be Performed in the Recording and Reproducing Apparatus]

Next, referring to the flowcharts of FIG. 7 to FIG. 11, actions (pieces of processing) to be performed in the recording and reproducing apparatus 100 will be described by orderly following subjects presented below.

(1) Disk loading processing
(2) Reading processing for reading a TOC (index) from the disk 1
(3) Processing to be performed at the time of receiving a reading request from the host PC
(4) All data items-of-disk 1 reading processing
(5) Seeking processing for seeking an address designated with the reading request (1) Disk Loading Processing In FIG. 7, whether insertion of the disk 1 into the disk drive device 20 has been sensed is decided (step S1). If the insertion has not been sensed, a decision is made that the disk has been ejected. The disk loading processing is then returned to step S1. If the insertion of the disk 1 has been sensed, a disk loading action is performed by the disk drive unit 21 (step S2).

Thereafter, read-in data is read from the disk 1 (step S3). Based on the read data, the type of the disk 1, the size thereof, and the ID thereof are identified (step S4). Thereafter, whether the appropriate and accessible disk 1 has been loaded by the disk drive unit 21 (see FIG. 1) is decided (step S5). If the disk 1 is not appropriate, the disk is ejected (step S6). The disk loading processing is then returned to step S1.

If a decision is made that the appropriate disk 1 has been loaded, a writing area having the same storage capacity as the loaded disk 1 has is preserved, and preparations for writing are made (step S7).

(2) Reading Processing for Reading an Index from the Disk 1

Thereafter, an example of the processing of reading a TOC from among read-in data items in the disk 1 through loading processing will be described below with reference to the flowchart of FIG. 8.

To begin with, the disk control unit 22 (see FIG. 1) designates a leading reading address in the disk 1 (step S11). In the cache memory 23, under the control of the memory control unit 24, a memory address associated with the address in the disk 1 is designated and preparations for writing are made (step S12).

Thereafter, a high-speed reading action for reading data from the disk 1 is initiated by the disk drive unit 21 (step S13). Reading data from the addresses designated at step S11 is initiated (step S14). Accordingly, a TOC (index) is read (step S15). The information of the read TOC is transferred to the cache memory 23 and written therein (step S16).

Thereafter, the disk drive device 20 notifies the host PC 10 of the fact that the valid (appropriate) disk 1 has been newly inserted (step S17). The host PC 10 reads the TOC, and identifies and mounts the disk 1 (step S18). The disk drive device 20 begins receiving a reading request from the host PC (step S19).

Figure 9:
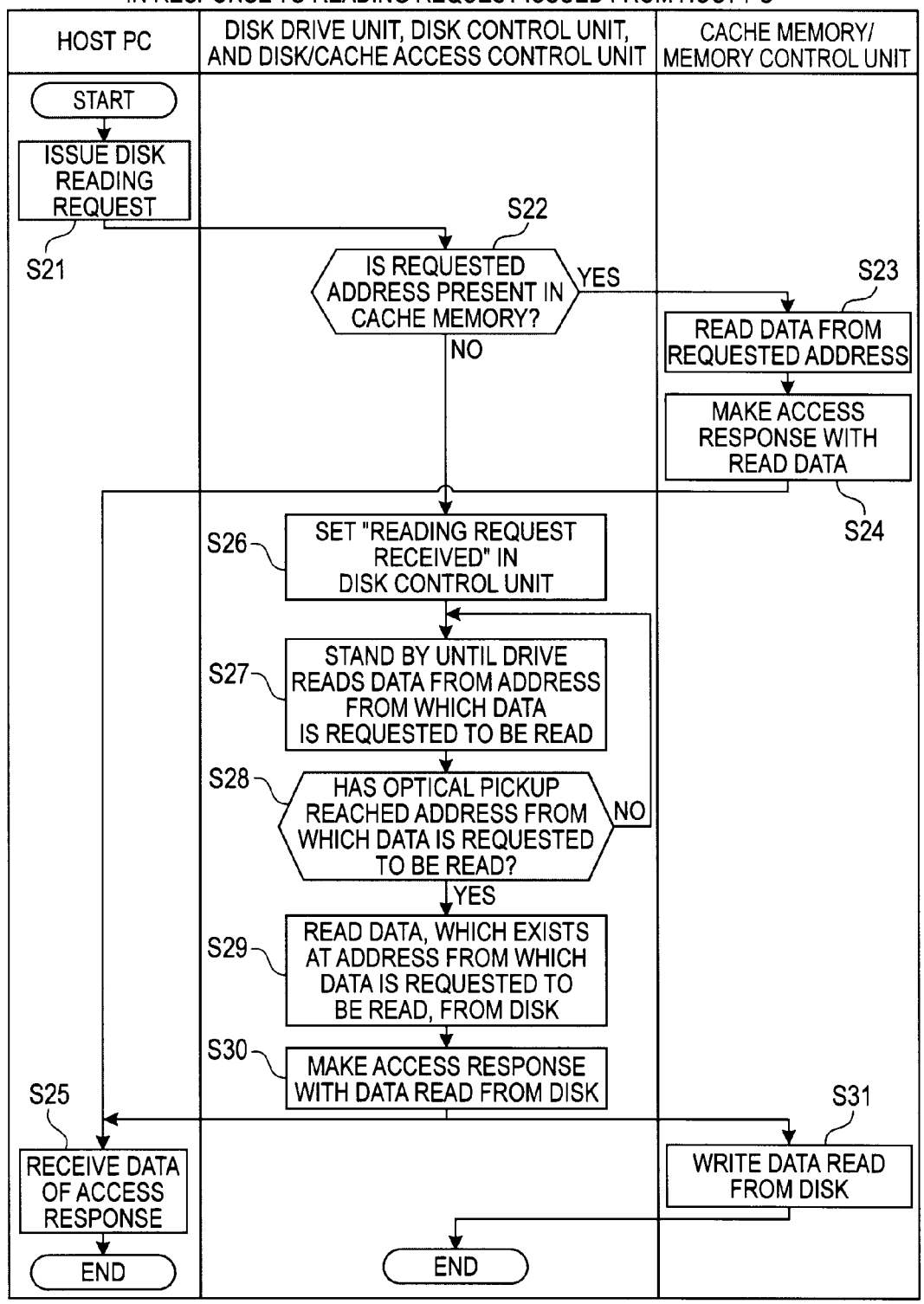
FIG. 9 is a flowchart showing an example of processing to be performed when a reading request is received from a host PC in the embodiment of the present invention.

(3) Processing to be Performed at the Time of Receiving a Reading Request from the Host PC Next, referring to the flowchart of FIG. 9, an example of processing to be performed at the time of receiving a reading request from the host PC 10 will be described below.

When a reading request for reading data from the disk 1 is transmitted from the host PC 10 (step S21), the disk/cache access control unit 27 (see FIG. 1) checks to see if a requested address is present in the cache memory 23 (step S22). If the requested address is present in the cache memory 23, data at the requested address is read from the cache memory 23 (step S23). An access response to the host PC 10 is made with the read data (step S24). The data transmitted from the cache memory 23 by making the access response is received by the host PC 10 (step S25).

If a decision is made at step S22 that the address whose reading is requested by the host PC 10 is absent from the cache memory 23, the disk drive control 22 sets Reading Request Received (step S26). A standby state is continued until data allocated to the address designated with the reading request is read by the disk drive unit 21 (step S27).

In the standby state, whether the optical pickup has reached the position designated with the reading request is decided (step S28). If the optical pickup has not reached the position, the processing is returned to step S27. If a decision is made that the optical pickup has reached the position, data at the position designated with the reading request is read from the disk 1 (step S29). With the read data, an access request is made to the host PC 10 (step S30). The read data is returned as the access response and also transmitted to the cache memory 23. The data read from the disk 1 is written in the cache memory 23 (step S31).

(4) All Data Items-of-Disk 1 Reading Processing

Next, referring to the flowchart of FIG. 10, all data items-of-disk 1 reading processing will be described below.

To begin with, the disk control unit 22 designates a disk reading unit block (step S41). What is referred to as the disk reading unit block is a unit in which data is read from the disk 1, such as, a unit of a sector or a unit of a block. After the disk reading unit block is designated, a memory address associated with an address in the disk 1 is designated in the cache memory 23, and preparations for writing is made (step S42).

Thereafter, the disk drive unit 21 reads data in units of the disk reading unit block (step S43). The read data is also transferred to the cache memory 23. Under the control of the memory control unit 24, the data read from the disk 1 is written in the cache memory 23 (step S44).

Thereafter, the disk/cache access control unit 27 decides whether a reading request has been received from the host PC 10 (step S45). If the request has not been received, whether a reading position in the disk 1 has reached a disk reading border point is decided (step S46). If a decision is made that the reading has proceeded up to the disk reading border point, whether reading the all data items-of-disk 1 reading is completed is decided (step S47). If a decision is made that all data items reading is completed, the all data items-of-disk 1 reading processing is terminated.

If a decision is made that the all data items-of-disk 1 reading is not completed, sequence analysis is carried out (step S48). An area determined as a subsequent reading destination through sequence analysis is designated as a seek destination (step S49). A seek action is performed in order to move the optical pickup to an address designated as the seek destination (step S50). After the seek action is completed, a reading destination in the disk 1 is set to the address whose seeking is completed (step S51).

If a decision is made at step S45 that a reading request has been issued from the host PC 10, whether a seek action is necessary to read data whose reading is requested is decided (step S52). If a decision is made that the seek action is unnecessary, the reading destination in the disk 1 is set to a subsequent address (step S54). Reading data is continued. The data reading processing corresponds to the processing of step S29 mentioned in FIG. 9.

If a decision is made at step S52 that a seek action is necessary, a position designated with the reading request is designated as a seek destination (step S53). The seek action is then performed in order to move the optical pickup to the designated address (step S50).

(5) Seeking Processing for Seeking an Address Designated with a Reading Request

Figure 11:
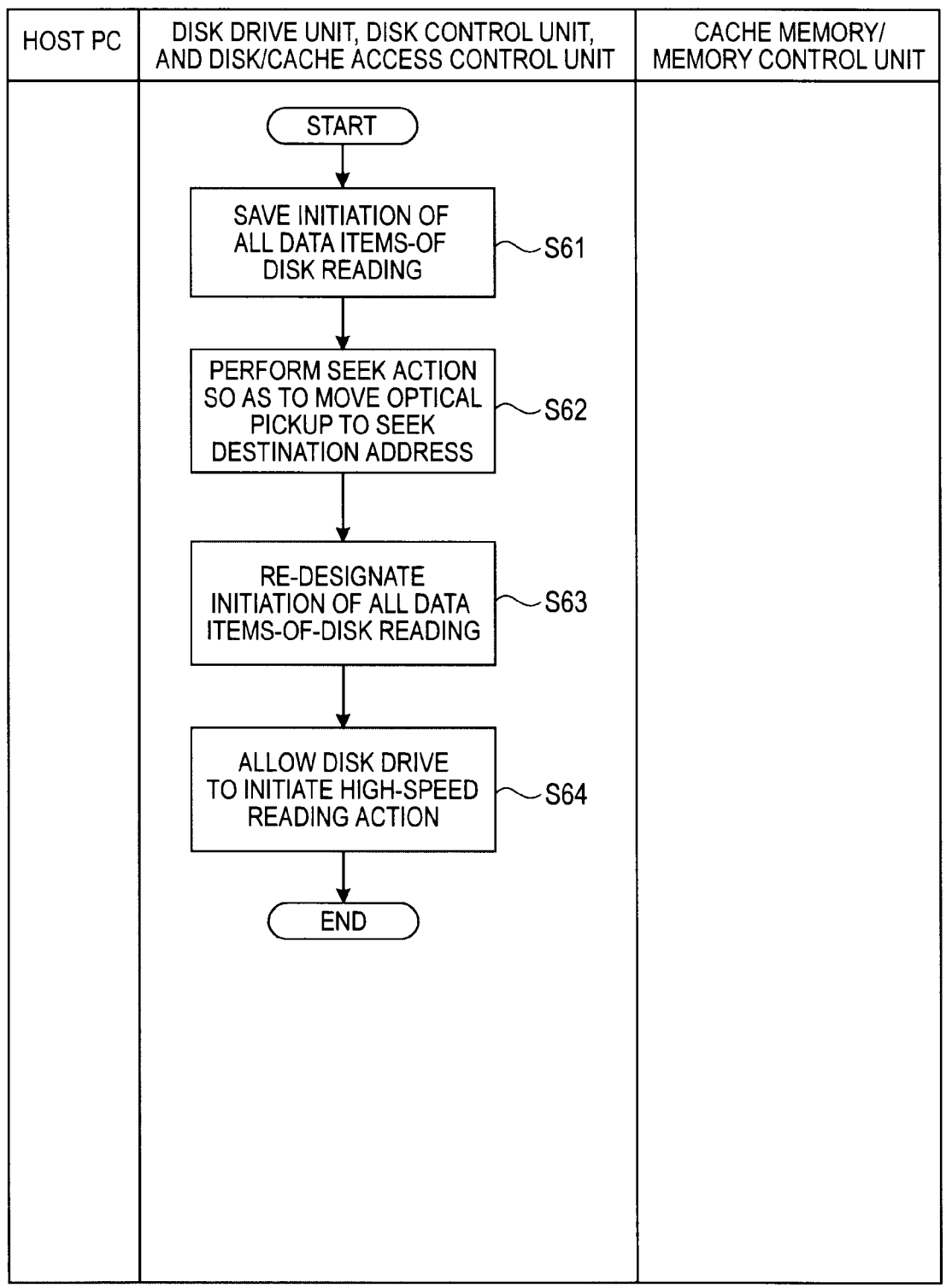
FIG. 11 is a flowchart showing an example of a seek action of making a movement to a designated address to be performed in the embodiment of the present invention.

Next, referring to the flowchart of FIG. 11, an example of a seek action to be performed in order to move the optical pickup to an address designated with a reading request will be described below.

Figure 10:
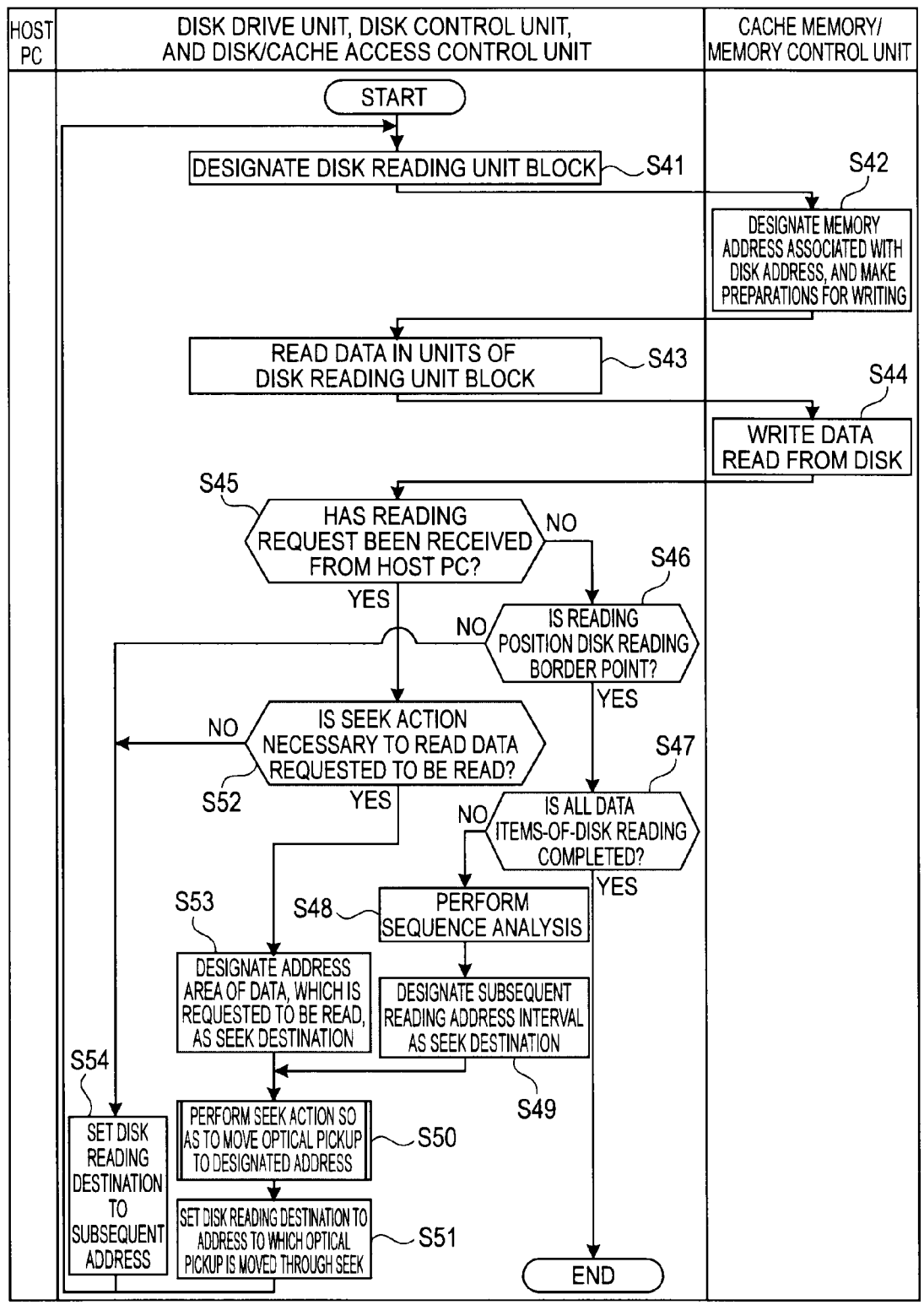
FIG. 10 is a flowchart showing an example of all data items-of-disk reading processing to be performed in the embodiment of the present invention.

If a position designated with a reading request is designated as a seek destination at step S53 mentioned in FIG. 10, or if seek is performed in order to move the optical pickup to a subsequent reading address interval (area) through sequence analysis, the disk control unit 22 saves initiation of an all data items-of-disk 1 reading action (step S61). A seek action is then performed in order to move the optical pickup to the address designated as the seek destination (step S62). After the seek action is completed, initiation of all data items-of-disk reading is designated again (step S63). High-speed reading processing for reading data from the disk 1 is resumed (step S64).

Advantage Provided by the Present Embodiment

According to the present embodiment, after the disk 1 is loaded, all data items in the disk 1 are stored in the cache memory 23. After storing all data items is completed, when a reading request is received from the host PC 10, data is read from the cache memory 23. Accordingly, since the necessity of performing a seek action for moving the optical pickup over the disk 1 according the reading request is obviated, reading processing can be speeded up.

Owing to the above constitution, even when addresses designated with a reading request are randomized, reading is performed quickly.

Unless a seek action is performed, all data items-of-disk 1 reading is performed at successive addresses at the highest speed. Writing data in the cache memory 23 is therefore completed for a short period of time.

According to the aforesaid embodiment, while all data items of the disk 1 are copied into the cache memory 23, even if a reading request is issued from the host PC 10, an access response is made to the host PC 10. Therefore, compared with a case where an access response is made after an all data items-of-disk 1 reading action is completed, the time elapsing from generation of the reading request to data reading is shortened.

According to the aforesaid embodiment, when a reading request is issued from the host PC 10 during all data items-of-disk 1 reading, either execution of a seek action and continuation of a data reading action is selected based on a situation. Therefore, while a reading request is responded to, data in the disk 1 is efficiently transferred to the cache memory 23.

According to the aforesaid embodiment, even while data is being read from the disk 1, if data whose reading is requested has already been transferred to the cache memory 23, an access response to the reading request is made at a high speed.

According to the aforesaid embodiment, the relatively inexpensive disk 1 is used for preservation or archive, and an access speed at which intended data is accessed can be raised by employing the cache memory 23.

When the cache memory 23 is realized with a flash memory, even after the power supply is turned off or the disk 1 is ejected from the disk drive device 20, data read from the disk 1 can be held in the cache memory 23.

Presumably, the aforesaid embodiment is especially effectively adapted to apparatuses presented below.

Apparatus that every time data becomes necessary, reads the necessary data from the disk 1 under the control of an operating system (OS) installed in the host PC 10 or by running an application.

Apparatus having all data items, which are recorded in the disk 1, read by the host PC 10.

Apparatus having data read from the disk 1 according to an instruction entered by a user and inputted to the host PC 10.

In apparatuses presented below, the present invention can be applied by devising an application. Advantages mentioned below can be provided.

(Compatible apparatus) Apparatus that reproduces data from the disk 1 in which a video content is recorded.

(Advantage) A reaction to a quickly advancing or returning manipulation or a jog-dial reproducing manipulation is speeded up by transferring an entire video content to the cache memory 23.

(Compatible apparatus) Apparatus that reproduces data from the disk 1 in which an audio content is recorded.

(Advantage) A listening action to be performed using a jog dial is smoothed by transferring an entire audio content to the cache memory 23.

In the aforesaid embodiment, a case where the cache memory 23 is incorporated in the disk drive device 20 is taken for instance. When reading alone is performed as it is in the present embodiment, the cache memory 23 may be incorporated in the host PC 10.

In the aforesaid embodiment, after the disk 1 is loaded, data in the disk 1 is automatically written in the cache memory 23. The present invention is not limited to this mode. Namely, when a facility is included for locking writing of data in the cache memory 23, both access to data in the disk 1 and access to data already recorded in the cache memory 23 can be achieved.

2. Variant 1 of the Embodiment

Figure 12:
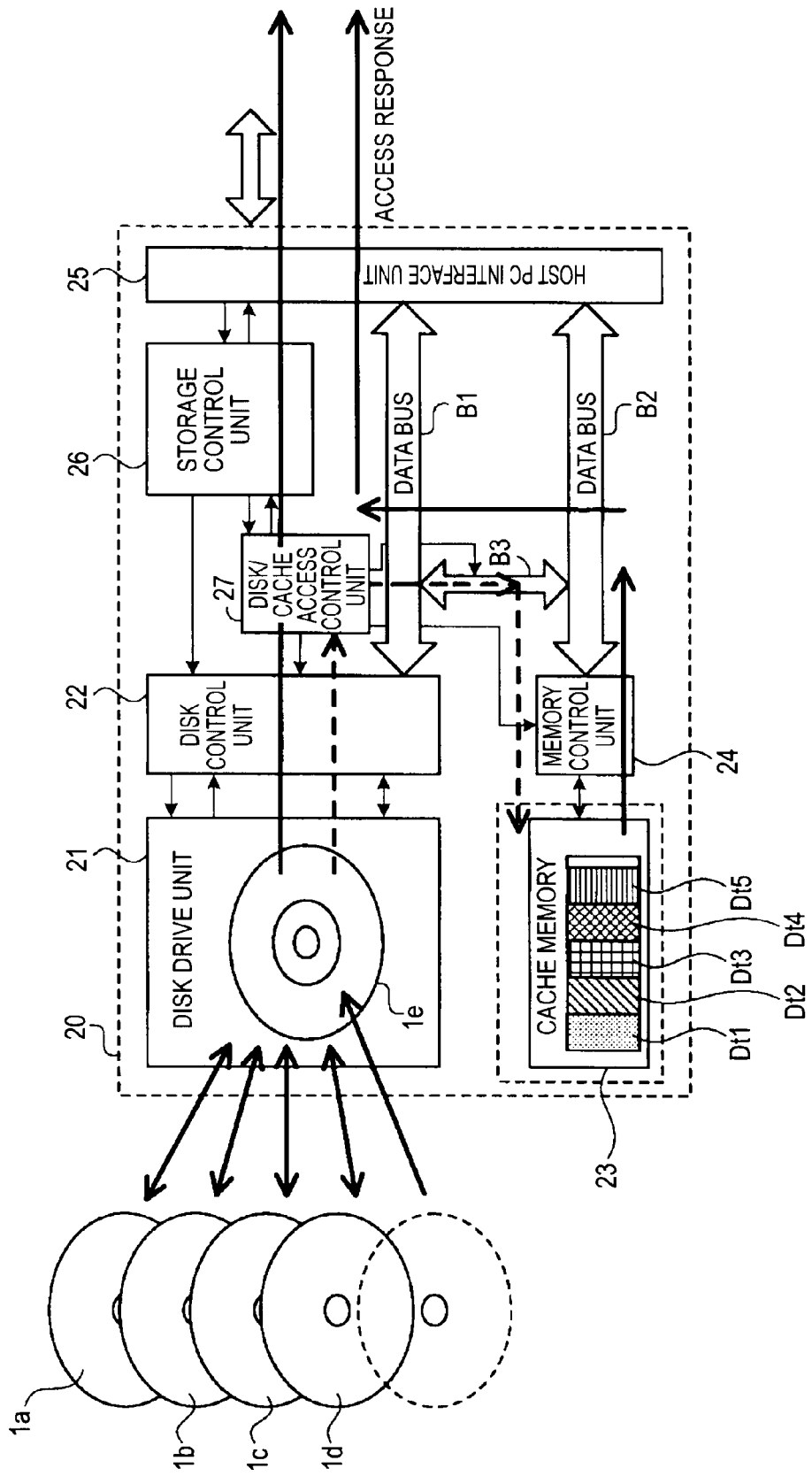
FIG. 12 is a block diagram showing an example of the configuration of a recording and reproducing apparatus in accordance with an example (1) of the embodiment of the present invention.

Next, an example (variant 1) in which data items in plural disks are read and stored will be described with reference to FIG. 12 to FIG. 15. FIG. 12 shows an example of the configuration of the recording and reproducing apparatus 100 to be applied to a case where data items in the plural disks 1 are stored in the cache memory 23. The same reference numerals are assigned to components identical to those shown in FIG. 1. An iterative description will be omitted.

FIG. 12 shows a state in which writing data items, which are stored in disks 1a to 1d, into the cache memory 23 is already completed and the disk drive unit 21 is reading data from the disk 1e.

In the cache memory 23, the data items read from the disks 1 are stored in the order in which the data items are read. In an example shown in FIG. 12, data Dt1 in the disk 1a, data Dt2 in the disk 1b, data Dt3 in the disk 1c, data Dt4 in the disk 1d, and data Dt5 in the disk 1e are stored in that order.

As a method for storing data in the cache memory 23, a conceivable method is a method in which sectional areas are defined in advance in the cache memory 23 in units of a storable area in which the data in any of the disks 1 can be stored, or a method in which recording areas have variable lengths dependent on lengths of data items recorded in the disks 1. Hereinafter, the former method shall be called a disk-data fixed length storage method, and the latter method shall be called a disk-data variable length storage method.

Figure 13:
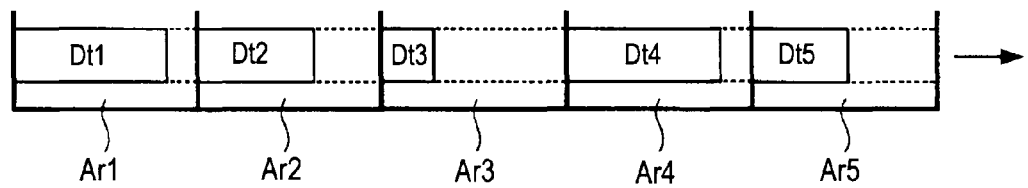
FIG. 13 is an explanatory diagram showing an example (1) of writing data in a cache memory in the example (1) of the embodiment of the present invention.

FIG. 13 shows an example of the disk-data fixed length storage method. The axis of abscissas indicates positions in the memory space in the cache memory 23. The entire area in the cache memory 23 is divided into five subareas of sectional areas Ar1 to Ar5 in order to store data items accommodated by five disks 1. Data items read from the disks 1 by the disk drive unit 21 (see FIG. 1 and FIG. 12) are written in units of the disk 1 in the successive sectional areas beginning with the sectional area Ar1.

In FIG. 13, the data Dt1 in the disk 1a is written in the sectional area Ar1, and the data Dt2 in the disk 1b is written in the sectional area Ar2. Likewise, the data Dt3 is written in the sectional area Ar3, the data Dt4 is written in the sectional area Ar4, and the data Dt5 is written in the sectional area Ar5. According to the disk-data fixed length storage method, even when an amount of data to be stored is smaller than the storage capacity of the sectional area Ar, data in the subsequent disk 1 is not stored in an unused area portion but the area portion remains unused.

In an example shown in FIG. 13, when the sixth disk 1 is read by the disk drive unit 21, data in any of the sectional areas Ar1 to Ar5 is overwritten with the read data. Whichever of the sectional areas Ar has data thereof overwritten is determined based on the preservative values of data items stored in the respective sectional areas Ar. For example, the sectional area Ar in which data whose reading frequency by which the data is read by the host PC 10 (see FIG. 1 and FIG. 12) is small is stored, or the sectional area Ar in which data whose access date is the oldest is stored is selected first.

When data whose reading frequency is small is overwritten, if the reading R frequencies within a predetermined time are counted as listed below, the sectional area Ar4 from which data has not been read within the predetermined time is selected as an area in which read data is stored next.

Sectional area Ar1: R, R, R
Sectional area Ar2: R
Sectional area Ar3: R
Sectional area Ar4:
Sectional area Ar5: R, R, R According to the method, the disk 1 can be identified based on the position of the sectional area Ar. Unnecessary data can be randomly deleted (overwritten) by designating the sectional area Ar.

Figure 14:
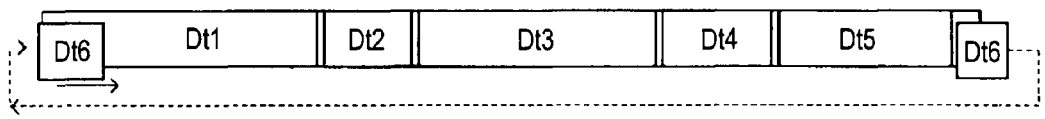
FIG. 14 is an explanatory diagram showing an example (2) of writing data in a cache memory in the example (1) of the embodiment of the present invention.

FIG. 14 shows an example of the disk-data variable length storage method. The axis of abscissas indicates positions in the memory space in the cache memory 23. FIG. 14 shows a state in which the data items Dt1 to Dt5 stored in the disks 1a to 1d are stored without any space between adjoining ones in the order in which the data items are read. If data in another disk 1 is read in this state, the read data Dt6 is written in the rearmost part of the data storable area in the cache memory 23. A portion of the data Dt6 that overflows the rearmost part is stored while being overwritten in the leading part of the data storable area. In other words, the data storable area is used like a loop, and writing data is performed in a first-in first-out (FIFO) manner.

According to the foregoing method, the memory use efficiency of the cache memory 23 can be improved.

Figure 15:
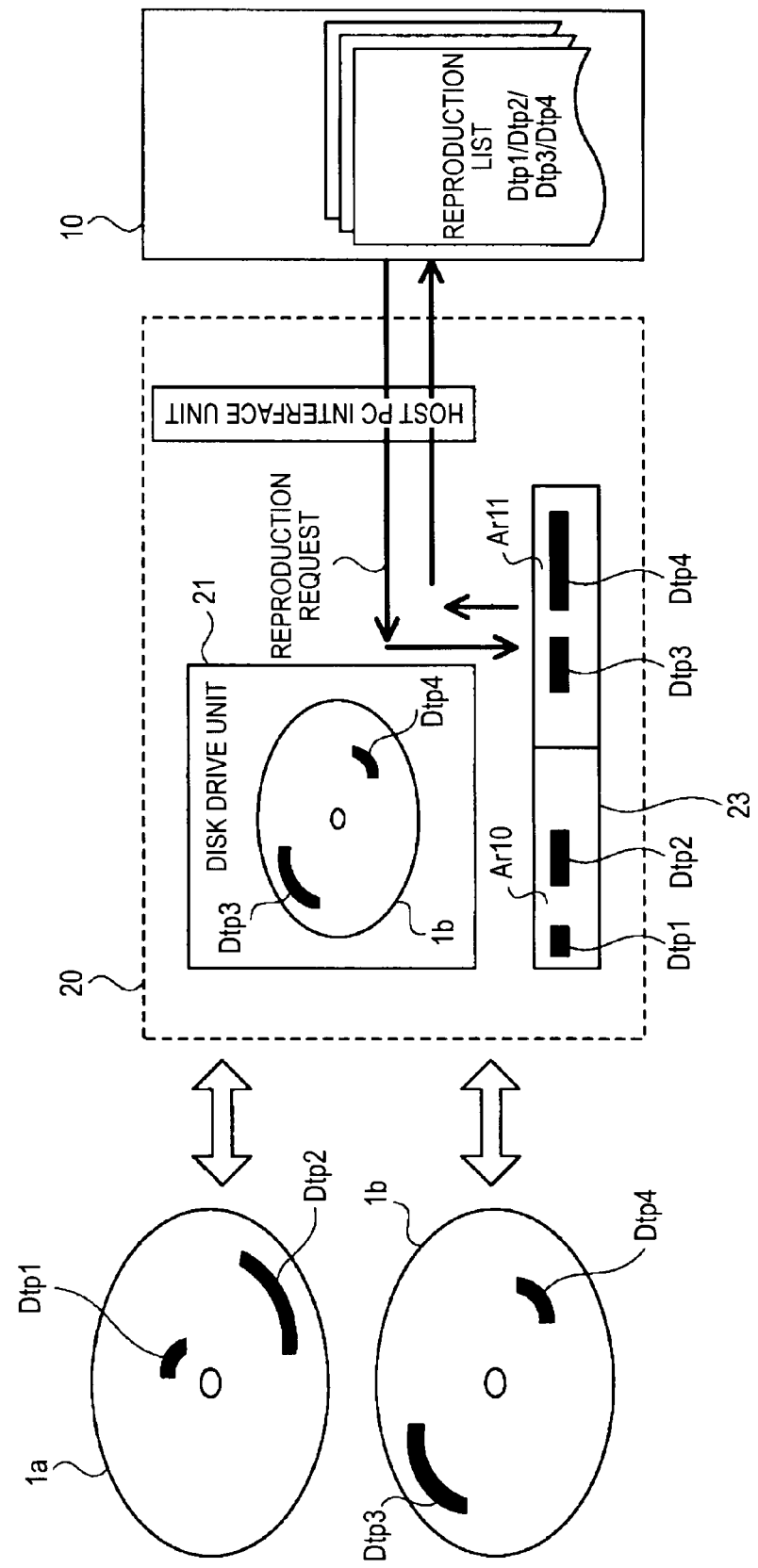
FIG. 15 is an explanatory diagram showing an example of data reproducing processing to be performed using a cache memory in the example (1) of the embodiment of the present invention.

Next, referring to FIG. 15, an example of a case where data items in plural disks 1 are stored and successively reproduced will be described below. In FIG. 15, the same reference numerals are assigned to components identical to those shown in FIG. 1 and FIG. 12. Reproduction data items Dtp1 and Dtp2 are stored in the disk 1a, and reproduction data items Dtp3 and Dtp4 are stored in the disk 1b. In the cache memory 23, a data storable area Ar10 and a data storable area Ar11 are defined.

In the data storable area Ar10, the reproduction data items Dtp1 and Dtp2 read from the disk 1a by the disk drive unit 21 are stored in the same order as the order in which the data items are stored in the disk 1a. In the data storable area Ar11, the reproduction data items Dtp3 and Dtp4 read from the disk 1b by the disk drive unit 21 are stored in the same order as the order in which the data items are stored in the disk 1b.

Pieces of information on the reproduction data items Dtp stored in the areas Ar in the cache memory 23 are transferred to the host PC 10 via the host PC interface unit 25 (see FIG. 1 and FIG. 12). In the host PC 10, a reproduction list is produced based on the pieces of information transferred from the disk drive device 20. In the reproduction list, the pieces of information on the reproduction data items Dtp1 to Dtp4 stored in the cache memory 23 shall be recorded together with information on the storage order.

In this state, if a user or the like enters a reproduction instruction signifying that data in the disk 1a and data in the disk 1b should be reproduced, a reproduction (reading) request is produced based on the reproduction list. The produced reproduction request is fed to the disk drive device 20 via the host PC interface unit. Based on the request, the reproduction data items Dtp1 to Dtp4 are sequentially read from the cache memory 23. Thus, the reproduction data items Dtp1 to Dtp4 stored in two disks are sequentially reproduced.

Figure 16:
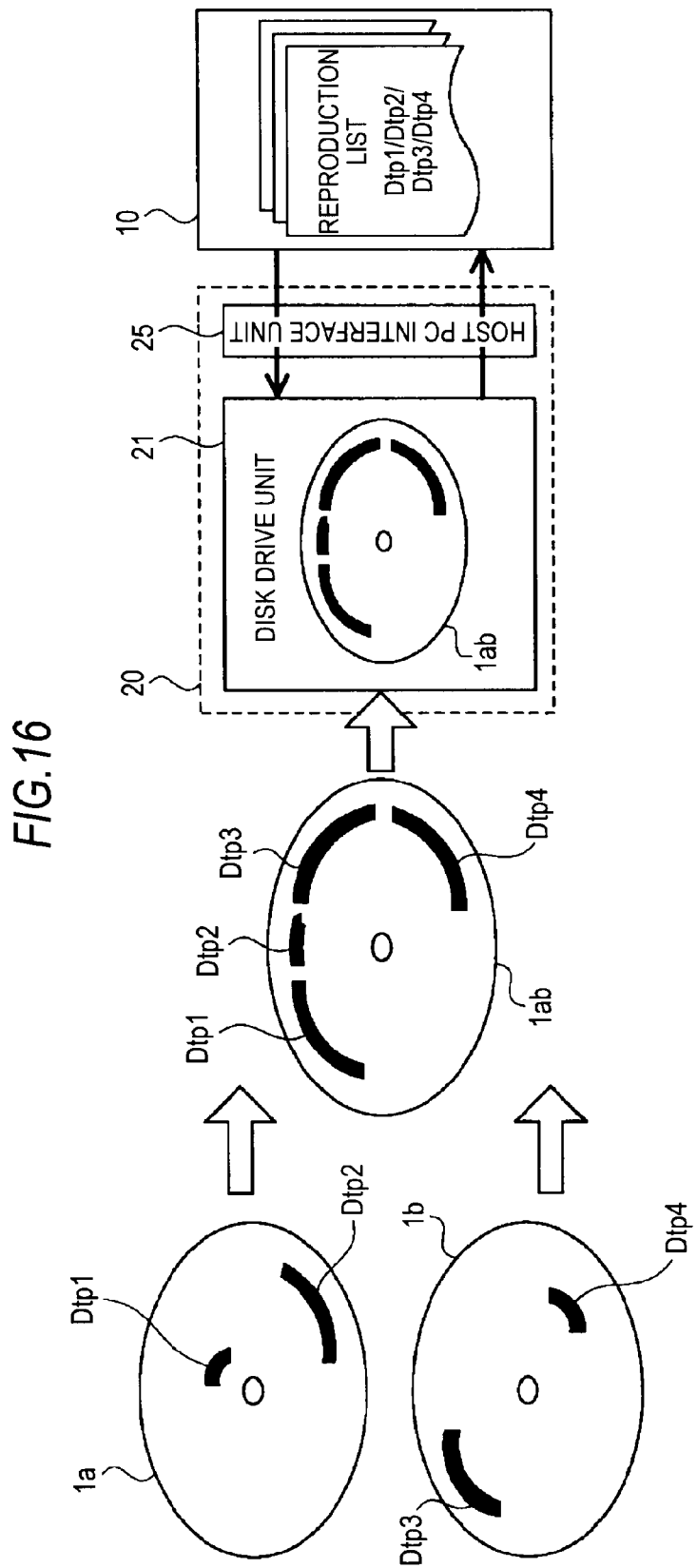
FIG. 16 is an explanatory diagram showing processing of reproducing data from plural disks according to a related art.

In the past, the reproduction data items Dtp have had to be, stored in advance in one disk 1ab as shown in FIG. 16, in order to sequentially reproduce the reproduction data items Dtp1 to Dtp4 stored in the two disks of the disk 1a and disk 1b. The reproduction is achieved by reading the reproduction data items Dtp1 to Dtp4 stored in the disk 1ab.

In contrast, according to the method of the present variant shown in FIG. 15, the new disk 1ab for reproduction may not be prepared, but data items stored in different disks can be sequentially reproduced.

3. Variant 2 of the Embodiment

Figure 17:
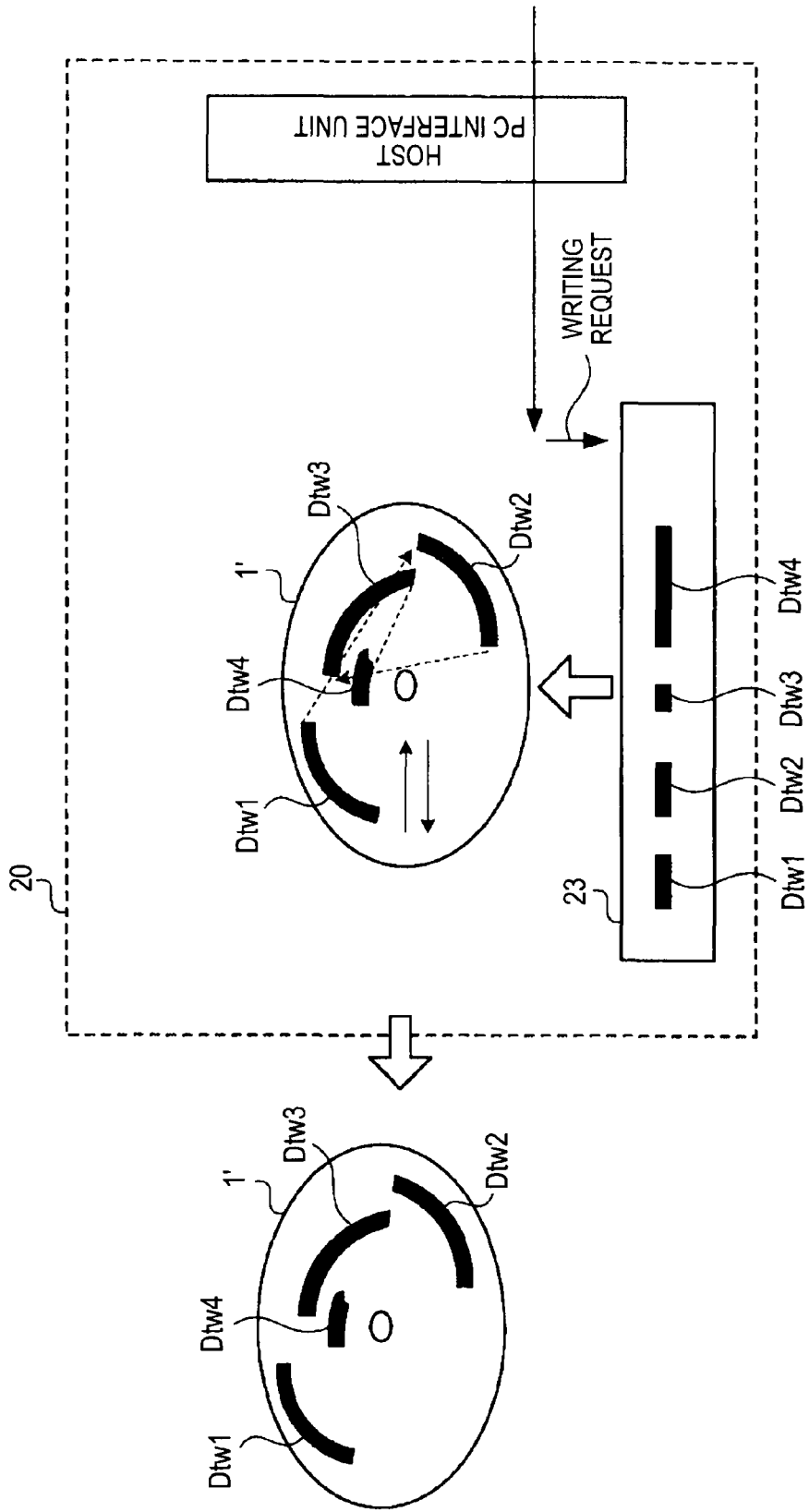
FIG. 17 is an explanatory diagram showing an example of writing processing to be performed using a writable disk in another example (2) of the embodiment of the present invention.

Next, an example (variant 2) in which data is read or written from or in a writable disk will be described with reference to FIG. 17 to FIG. 20. FIG. 17 shows an example in which data is written in a writable disk 1' according to the present example (variant 2). The same reference numerals are assigned to components identical to those shown in FIG. 1. Data items read from the disk 1' are stored in the cache memory 23. The stored data items shall be rewritten in response to a writing request issued from the host PC 10.

In FIG. 17, areas in the cache memory 23 having data items thereof rewritten in response to a writing request issued from the host PC 10 are shown as rewrite blocks Dtw1 to Dtw4. In the present variant, pieces of information on the areas having data items thereof rewritten are written again in the disk 1' at the timing at which a manipulation of ejecting the disk 1' is performed.

In order to reflect the pieces of information on the areas on the disk 1' having data items thereof rewritten, a decision is made on whether it takes a shorter time to rewrite all the data items in the disk 1' using the pieces of information on the areas having data items thereof rewritten, or to rewrite part of the data items in the disk 1'. For data reproduction, the rewrite blocks Dtw1 to Dtw4 are rearranged so that the optical pickup (not shown) will be moved in either a direction from the external circumference of the disk 1' to the internal circumference thereof or a reverse direction. Finally, the data items in the rearranged rewrite blocks are written in the disk 1' according to the rewriting manner (entirely or partly) selected at the above timing.

In the present variant, the processing of protecting the blocks Dtw in the cache memory 23 which have data items thereof rewritten in response to a writing request issued from the host PC 10 is carried out. Data items that have been rewritten in response to the writing request but have not been written in the disk 1 are thus prevented from being overwritten with other data items. More particularly, the pieces of information on the blocks Dtw having data items thereof rewritten in response to a rewriting request issued from the host PC 10 are managed using a cache memory management list (not shown) stored in the control data storage area 23$a1$ (see FIG. 4) in the cache memory 23.

Figure 19:
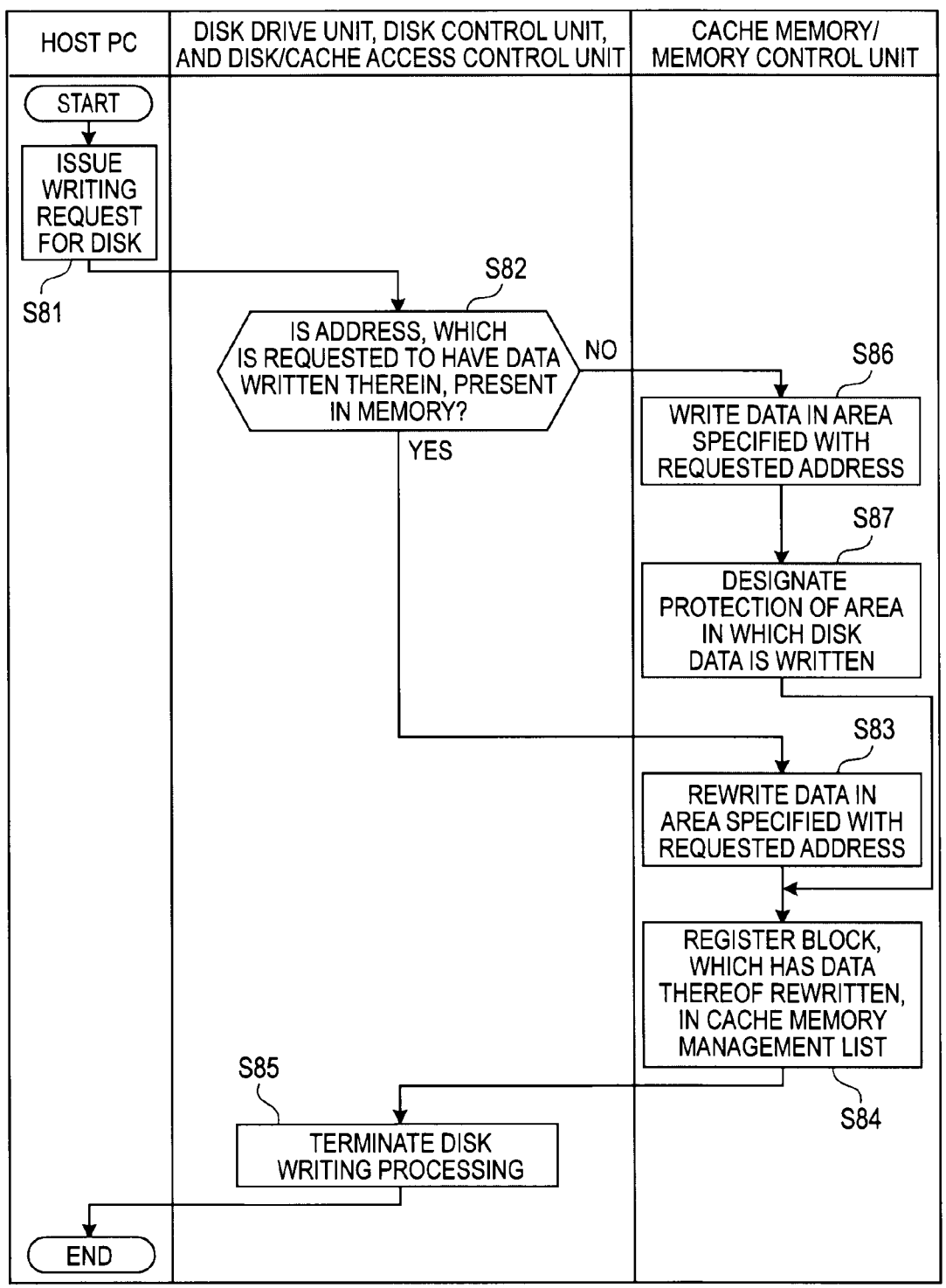
FIG. 19 is a flowchart showing an example of processing to be performed at the time of receiving a reading request from a host PC in the example (2) of the embodiment of the present invention.
Figure 20:
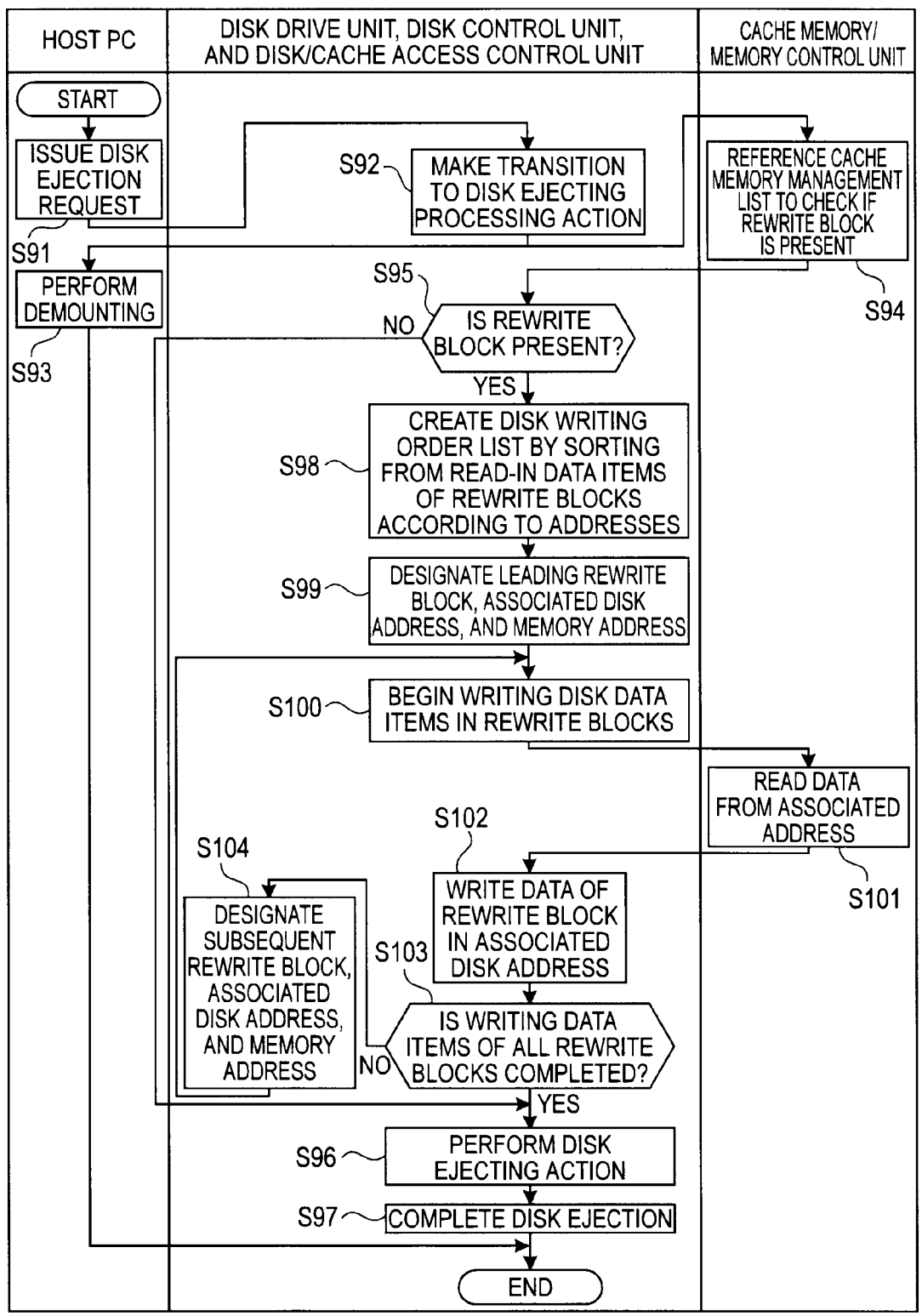
FIG. 20 is a flowchart showing an example of disk ejecting processing to be performed in the example (2) of the embodiment of the present invention.

Next, an example of actions to be performed in the recording and reproducing apparatus 100 of the present variant will be described with reference to the flowcharts of FIG. 18 to FIG. 20 by sequentially following the subjects presented below.

Figure 18:
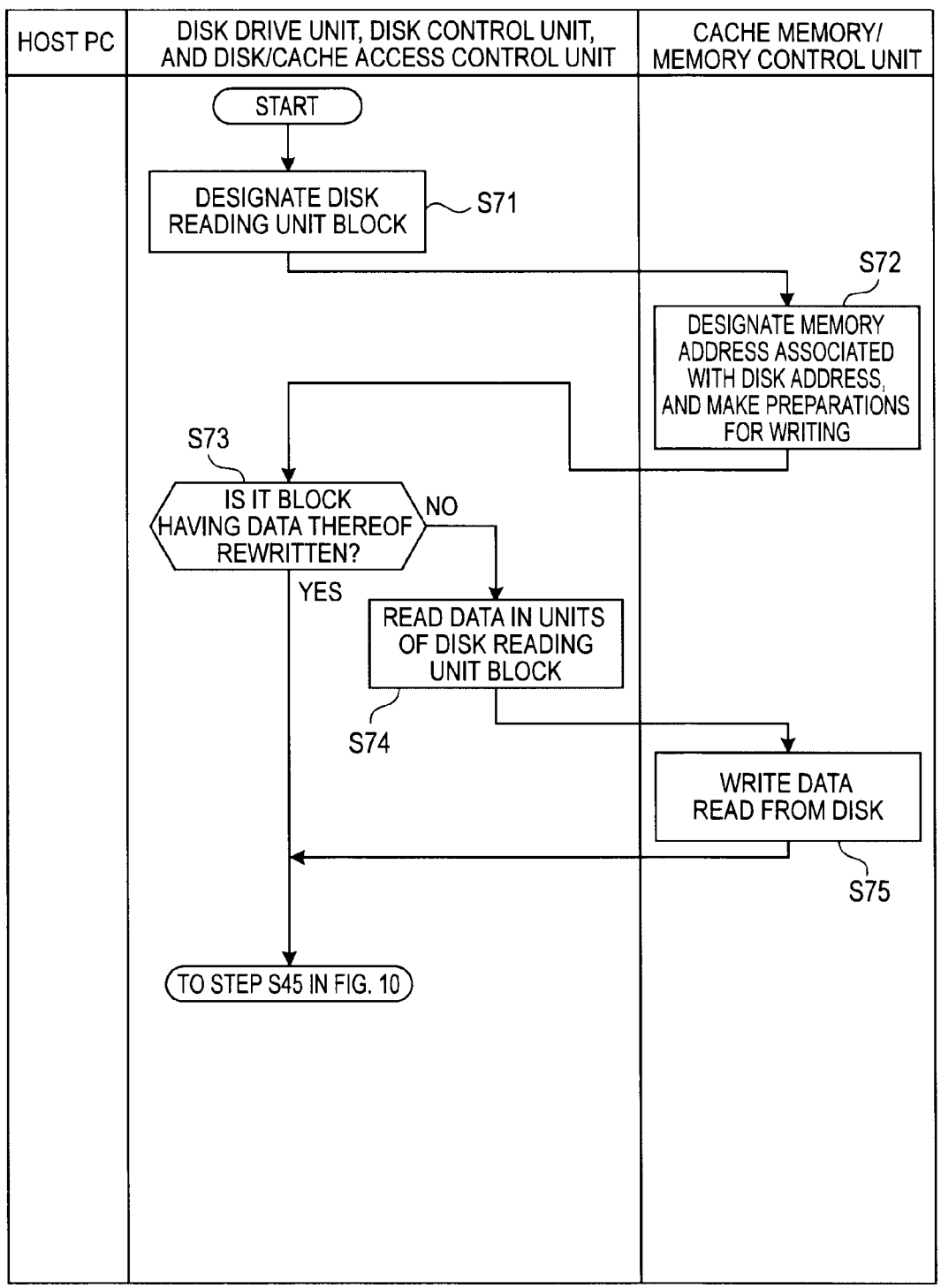
FIG. 18 is a flowchart showing an example of all data items-of-disk reading processing to be performed in the example (2) of the embodiment of the present invention.

(1) All data items-of-disk 1' reading processing
(2) Processing to be performed at the time of receiving a writing request from the host PC
(3) Disk 1' ejecting processing (1) All Data Items-of-Disk 1' Reading Processing FIG. 18 shows an example of all data items-of-disk 1' reading processing. To begin with, the disk control unit 22 (see FIG. 1) designates a disk reading unit block (step S71). In the cache memory 23, a memory address associated with the one in the disk 1 is designated and preparations for writing are made (step S72).

Thereafter, whether a block of a data reading destination is a block having data thereof rewritten in response to a writing request issued from the host PC 10 is decided (step S73). If a decision is made that the block is not a block having data thereof rewritten, data is read in units of the disk reading unit block (step S74). In the cache memory 23, the data read from the disk 1' is written (step S75). The processing then proceeds to step S45 mentioned in FIG. 10.

If a block of a data reading destination is a block having data thereof rewritten, the processing proceeds to step S45 mentioned in FIG. 10. Step S45 mentioned in FIG. 10 and subsequent steps are identical to those described previously. An iterative description will be omitted.

If it is found at step S73 that the whole of data in a block is not rewritten but part of the data in the block is rewritten, No is selected. At the next step S75, data is written in a block in the cache memory 23 other than blocks having data items thereof rewritten.

(2) Processing to be Performed at the Time of Receiving a Writing Request from the Host PC Next, referring to FIG. 19, an example of processing to be performed at the time of receiving a writing request from the host PC 10 will be described below.

To begin with, a writing request for the disk 1 is transmitted from the host PC 10 (step S81). The disk/cache access control unit 27 (see FIG. 1) verifies whether a requested address is present in the cache memory 23 (step S82). If the requested address is present in the cache memory 23, data in an area specified with the requested address is overwritten with new data (step S83). Information on the area or block having data thereof rewritten is registered in the cache memory management list in the cache memory 23 (step S84). When writing data operation performed by the storage control unit 26 is completed (step S85), the processing is terminated.

If a decision is made at step S82 that an address requested to have data written therein by the host PC 10 is absent from the cache memory 23, data is written in an area specified with the requested address (step S86). Protection of the area, in which data is written, from being overwritten is designated (step S87). Information on the area or block having data thereof rewritten is registered in the cache memory management list in the cache memory 23 (step S84). Processing succeeding the step S84 is identical to the aforesaid one. An iterative description will be omitted.

(3) Disk 1' Ejecting Processing

Next, referring to FIG. 20, an example of processing to be performed at the time of ejecting the disk 1' will be described below. First, an ejection request for the disk 1' is issued from the host PC 10 (step S91). The disk control unit 22 makes a transition to a disk ejection processing action (step S92). The host PC 10 then performs demounting (step S93).

In the cache memory 23, the memory control unit 24 uses the cache memory management list to check if a rewrite block is present (step S94). The disk control unit 22 decides based on the result of the checking performed at step S94 whether a rewrite block is present (step S95). If a decision is made that a rewrite block is absent, the disk drive unit 21 performs disk 1' ejecting processing (step S96). The processing is terminated after the disk 1' is ejected (step S97).

If a decision is made at step S95 that a rewrite block is present, the disk control unit 22 creates a disk writing order list (not shown) (step S98). What is referred to as the disk writing order list is a list created by sorting pieces of information on detected rewrite blocks according to the addresses beginning with an address that specifies an area succeeding an area in the disk 1' in which read-in data items are stored.

At the next step S99, based on the disk writing order list, the first rewrite block is selected as a block from which data is written in the disk 1'. An associated address in the disk 1' and the address of the block in the cache memory 23 are designated. Thereafter, writing the data of the selected rewrite block in the disk 1' is initiated (step S100). The data of the rewrite block is read from the cache memory 23 (step S101).

The data of the rewrite block read from the cache memory 23 is written at the associated address in the disk 1' (step S102). Thereafter, whether writing the data items of all the rewrite blocks in the disk 1' is completed is decided (step S103). If a decision is made that writing the data items of all the rewrite blocks has not been completed, the subsequent rewrite block is designated and an associated address in the disk 1' and the address of the rewrite block in the cache memory 23 are designated (step S104). The processing is resumed from step S100. If a decision is made that writing the data items of all rewrite blocks is completed, the processing proceeds to step S96. Disk 1' ejecting processing is then carried out.

Writing data of a rewrite block in the disk 1' shall be performed at the highest writing speed which the disk drive unit 21 can support.

Advantage of the Embodiment

According to the foregoing embodiment (variant 2), when data has to be written in the disk 1', the data is written in the cache memory 23. Even if an address requested to have data thereof read by the host PC 10 is randomized or separated away, writing can be achieved at a high speed.

Reflecting rewritten data items on the disk 1' is performed comprehensively at the time of ejecting the disk 1'. Therefore, a wait time arisen during data writing can be greatly saved.

Reflection of rewritten data items on the disk 1' is achieved with the data items sorted so that the optical pickup will move in a direction from the external circumference of the disk 1' to the internal circumference thereof or a direction from the internal circumference thereof to the external circumference thereof. Therefore, a seek time necessary to write the data items in the disk 1' can be reduced. In addition, all data items in areas in the cache memory equivalent to areas in the disk 1' can be written in the disk 1' without the necessity of performing a seek action for each of rewritten data items.

4. Variant 3 of the Embodiment

Next, an example (variant 3) in which a typical memory card is adopted as the cache memory 23 will be described with reference to FIG. 21. In FIG. 21, the same reference numerals are assigned to components identical to those shown in FIG. 1. An iterative description will be omitted.

A disk drive device 20' shown in FIG. 21 adopts a typical memory card 28, which is realized with a flash memory or the like, as the cache memory 23. Owing to the configuration, the cache memory 23 may not be newly included, but the feature of the present invention can be embodied. In this case, when the memory card 28 is loaded, the memory card 28 is used as the cache memory 23. When the memory card 28 is not loaded, the configuration that is employed in the related art and that does not include the cache memory 23 may be applied. When the memory card 28 is adopted as the cache memory 23, the storage capacity of the memory card 28 shall be larger than the storage capacity of the disk 1 (1').

In the foregoing embodiment, the present invention is applied to the typical recording and reproducing apparatus 100 (100'). However, the present invention is not limited to this mode. The present invention may be applied to a game machine, a personal computer, an audio or video recording and reproducing apparatus, or any other apparatus as long as the apparatus performs an action of reading data recorded in the disk 1 (1').

The present application contains subject matter related to that disclosed in Japanese Priority Patent Application JP 2009-055570 filed in the Japan Patent Office on Mar. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing apparatus comprising:
a drive unit that reads data from a first medium that is a medium in which data is recorded;
a drive unit control unit that controls the drive unit;
a second medium having a memory capacity greater than or equal to a memory capacity of the first medium and having a speed at which data is read or written from or in the second recording medium that is higher than a speed at which data is read or written from or in the first medium;
a second medium control unit that controls reading or writing of data from or in the second medium;
an input/output unit that inputs a reading request fed from a control unit that issues the reading request with which predetermined data is read from among data items stored in the first medium or second medium, and outputs data designated with the reading request; and
an access control unit that controls the drive unit control unit or second medium control unit to, after a loading action is performed on the first medium by the drive unit, initiate reading of all data items recorded in the first medium to the second medium, and upon determination that the reading request for the predetermined data is inputted prior to completion of reading of all the data items, and that the predetermined data is not located in the second medium,
the reading is stopped at a first position to search the first medium to determine a second position in the first medium corresponding to a beginning of the predetermined data to output the predetermined data to the input/output unit,
and after the predetermined data is outputted,
the reading of the data items from the first medium is resumed at a third position until an end of the data items is reached in the first medium, the third position corresponding to the end of the predetermined data and distinguishable from the end of the data items, and upon reaching the end of the data items,
reading of the data items from the first medium to the second medium is resumed at the first position to read data items from the first medium between the first and second positions.

2. The recording and reproducing apparatus according to claim 1, wherein the access control unit controls the drive unit control unit or second medium control unit so that when the reading request is received prior to completion of reading of all data items recorded in the first medium, the reading request is responded to, and the read data items are written in the second medium.

3. The recording and reproducing apparatus according to claim 2, wherein when the reading request is issued from the control unit, the access control unit determines a distance between the second position corresponding to the beginning of the predetermined data and the first position at which reading is currently in progress, and a seek action time it takes to move to the position designated with the reading request, and decides whether an action of reading data from the first medium is continued and the reading request is responded to, or a seek action is performed.

4. The recording and reproducing apparatus according to claim 3, wherein an action of reading all data items stored in the first medium is carried out at a highest speed supported by the drive unit.

5. The recording and reproducing apparatus according to claim 4, wherein the first medium is a removable disk, and the second medium is a cache memory.

6. The recording and reproducing apparatus according to claim 5, wherein data items read from a plurality of first media by the drive unit are stored in the second medium in the order in which the data items are read.

7. The recording and reproducing apparatus according to claim 6, wherein:
a same number of data recordable areas as a number of first media corresponding to the plurality of first media are defined in the second medium; and
data items stored in the plurality of data recordable areas are overwritten with data, which is newly read from the first medium, in ascending order of a priority determined based on the reading frequency of data recorded in the data recordable area, or the date of reading thereof.

8. The recording and reproducing apparatus according to claim 6, wherein data recordable areas having variable lengths dependent on the lengths of data items recorded in the plurality of first media are defined in the second medium, and data items read from the first media are written in the data recordable areas in a first-in first-out manner.

9. The recording and reproducing apparatus according to claim 6, wherein when ejecting processing is performed on the first medium, the drive unit control unit extracts data items from areas in the second medium which have data items thereof rewritten in response to a data writing request issued from the control unit, and sorts the extracted data items so that a pickup included in the drive unit will move in a direction from the external circumference of the first medium to the internal circumference thereof or a direction from the internal circumference thereof to the external circumference thereof.

10. A recording and reproducing method comprising the steps of:

reading data from a first medium that is a medium in which data is recorded;

controlling reading or writing of data from or in a second medium having a memory capacity greater than or equal to a memory capacity of the first medium and having a speed at which data is read or written from or in the second recording medium that is higher than a speed at which data is read or written from or in the first medium;

initiating reading of all data items from the first medium to the second medium after a loading action is performed on the first medium;

upon determination that a reading request for predetermined data is issued from an input unit prior to reading of all data items from the first medium, and that the predetermined data is not located in the second medium, suspending the reading at a first position to search the first medium to determine a second position in the first medium corresponding to a beginning of the predetermined data;

outputting, from the second position in the first medium, the predetermined data to the input unit;

resuming, after the outputting of the predetermined data is completed, reading of the data items from the first medium at a third position until an end of the data items is reached in the first medium, the third position corresponding to the end of the predetermined data and distinguishable from the end of the data items; and upon reaching the end of the data items in the first medium, resuming reading of the data items from the first medium at the first position to read data items from the first medium between the first and second positions.

\* \* \* \* \*